(12) United States Patent
Hayes

(10) Patent No.: US 7,625,994 B2
(45) Date of Patent: *Dec. 1, 2009

(54) SULFONATED ALIPHATIC-AROMATIC COPOLYETHERESTERS

(75) Inventor: Richard Allen Hayes, Beaumont, TX (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 1046 days.

This patent is subject to a terminal disclaimer.

(21) Appl. No.: 10/209,369

(22) Filed: Jul. 30, 2002

(65) Prior Publication Data

US 2004/0024101 A1   Feb. 5, 2004

(51) Int. Cl.
*C08G 75/00* (2006.01)

(52) U.S. Cl. ............. 528/295; 528/293; 528/296; 528/272; 524/445; 523/124

(58) Field of Classification Search .......... 528/272, 528/295, 296, 271, 293, 302, 303, 304; 524/445, 524/442, 443, 444, 446, 447, 448, 449, 450, 524/451; 523/124, 125, 521
See application file for complete search history.

(56) References Cited

U.S. PATENT DOCUMENTS

| | | | |
|---|---|---|---|
| 2,744,087 A | 5/1956 | Snyder |
| 3,023,192 A | 2/1962 | Shivers, Jr. |
| 3,103,914 A | 9/1963 | Summers |
| 3,243,413 A | 3/1966 | Bell et al. |
| 3,261,812 A | 7/1966 | Bell et al. |
| 3,558,557 A | 1/1971 | Hrach et al. |
| 3,563,942 A | 2/1971 | Heiberger |
| 3,634,541 A | 1/1972 | Popp et al. |
| 3,651,014 A | 3/1972 | Witsiepe |
| 3,663,653 A | 5/1972 | Frohlich et al. |
| 3,684,766 A | 8/1972 | Jackson, Jr. et al. |
| 3,701,755 A | 10/1972 | Surnoto et al. |
| 3,763,109 A | 10/1973 | Witsiepe |
| 3,766,146 A | 10/1973 | Witsiepe |
| 3,775,373 A | 11/1973 | Wolfe, Jr. |
| 3,775,374 A | 11/1973 | Wolfe, Jr. |
| 3,775,375 A | 11/1973 | Wolfe, Jr. |
| 3,779,993 A | 12/1973 | Kibler, et al. |
| 3,784,520 A | 1/1974 | Hoeschele |
| 3,801,547 A | 4/1974 | Hoeschele |
| 3,880,976 A | 4/1975 | Sumoto et al. |
| 3,932,319 A | 1/1976 | Clendinning et al. |
| 3,948,859 A | 4/1976 | Sublett et al. |
| 3,959,213 A | 5/1976 | Gilkey et al. |
| 3,981,833 A | 9/1976 | Lark |
| 4,003,882 A | 1/1977 | Fagerburg et al. |
| 4,003,883 A | 1/1977 | Fagerburg et al. |
| 4,006,123 A | 2/1977 | Samuelson et al. |
| 4,022,740 A | 5/1977 | Morie et al. |
| 4,076,798 A | 2/1978 | Casey et al. |
| 4,104,262 A | 8/1978 | Schade |
| 4,119,680 A | 10/1978 | Vachon |
| 4,132,707 A | 1/1979 | Borman |
| 4,136,715 A | 1/1979 | McCormack et al. |
| 4,145,466 A | 3/1979 | Leslie et al. |
| 4,156,774 A | 5/1979 | Buxbaum et al. |
| 4,166,895 A | 9/1979 | Buxbaum et al. |
| 4,217,441 A | 8/1980 | Bayless |
| 4,250,280 A | 2/1981 | Tanaka et al. |
| 4,251,652 A | 2/1981 | Tanaka et al. |
| 4,256,860 A | 3/1981 | Davis et al. |
| 4,262,114 A | 4/1981 | Wagener et al. |
| 4,295,652 A | 10/1981 | Saito et al. |
| 4,315,882 A | 2/1982 | Kiratsuka et al. |
| 4,328,059 A | 5/1982 | Horlbeck et al. |
| 4,328,278 A | 5/1982 | Sublett |
| 4,328,333 A | 5/1982 | Barbee et al. |
| 4,340,519 A | 7/1982 | Kotera et al. |
| 4,349,469 A | 9/1982 | Davis et al. |
| 4,355,155 A | 10/1982 | Nelsen |

(Continued)

FOREIGN PATENT DOCUMENTS

WO   WO 96/38282      12/1996
WO   WO 01/19909 A1   3/2001

OTHER PUBLICATIONS

R. Storbeck, et al., Synthesis and Thermal Analysis of Copolyesters Deriving from 1,4:3,6-Dianhydrosorbitol, Ethylene Glycol, and Terephthalic Acid, Journal of Applied Polymer Science, 1996, 1199-1202, vol. 59, John Wiley & Sons, Inc.
Rhomie L. Heck, III, et al, Blowing Agents, Encyclopedia of Polymer Science and Engineering Second Edition, 1985, 434-446, vol. 2, John Wiley & Sons, Inc., New York, NY.
Wayne R. Sorenson, et al., Preparative Methods of Polymer Chemistry, 1981, 35, Interscience Publishers, Inc., New York.
Sydney Ross, Foamed Plastics, Kirk-Othmer Encyclopedia of Chemical Technology Third Edition, 1980, 82-145, vol. 11, John Wiley & Sons, Inc., New York, NY.
Christopher Irwin, Blow Molding, Encyclopedia of Polymer Science and Engineering, 1985, 447-478, vol. 2, John Wiley & Sons, New York, NY.

*Primary Examiner*—Ling-Siu Choi
*Assistant Examiner*—Frances Tischler

(57) ABSTRACT

A sulfonated aliphatic-aromatic copolyetherester that comprises the polymerization product of 80.0 to 20.0 mole percent of an aromatic dicarboxylic acid or an ester thereof based on the total moles of dicarboxylic acid or ester thereof, 20.0 to 80.0 mole percent of an aliphatic dicarboxylic acid or an ester thereof based on the total moles of dicarboxylic acid or ester thereof, 0.1 to 10.0 mole percent of a sulfonate component, 99.9 to 91.0 mole percent of a first glycol selected from the group consisting of ethylene glycol, 1,3-propanediol and 1,4-butanediol based on the total moles of glycol, 0.1 to 4.0 mole percent of a poly(alkylene ether) glycol based on the total moles of glycol, 0 to 5.0 mole percent of an other glycol based on the total moles of glycol, and 0 to 5.0 mole percent of a polyfunctional branching agent.

16 Claims, No Drawings

U.S. PATENT DOCUMENTS

| | | |
|---|---|---|
| 4,390,687 A | 6/1983 | Tung |
| 4,419,507 A | 12/1983 | Sublett |
| 4,467,595 A | 8/1984 | Kramers |
| 4,476,189 A | 10/1984 | Posey et al. |
| 4,483,976 A | 11/1984 | Yamamoto et al. |
| 4,525,419 A | 6/1985 | Posey et al. |
| 4,576,997 A | 3/1986 | Trotter et al. |
| 4,585,687 A | 4/1986 | Posey et al. |
| 4,598,142 A | 7/1986 | Hilbert et al. |
| 4,600,743 A | 7/1986 | Shizuki et al. |
| 4,604,446 A | 8/1986 | Sand et al. |
| 4,626,183 A | 12/1986 | Shirai et al. |
| 4,670,498 A | 6/1987 | Furusawa et al. |
| 4,687,835 A | 8/1987 | Zeilstra et al. |
| 4,746,478 A | 5/1988 | Fujisaki et al. |
| 4,761,256 A | 8/1988 | Hardenbrook et al. |
| 4,840,984 A | 6/1989 | Somemiya et al. |
| 4,906,729 A | 3/1990 | Greene et al. |
| 4,929,714 A | 5/1990 | Trotter et al. |
| 4,937,314 A | 6/1990 | Greene |
| 4,966,959 A | 10/1990 | Cox et al. |
| 4,968,778 A | 11/1990 | Still et al. |
| 4,970,275 A | 11/1990 | Still et al. |
| 4,985,536 A | 1/1991 | Figuly |
| 4,999,388 A | 3/1991 | Okamoto |
| 5,000,844 A | 3/1991 | Cloup |
| 5,000,991 A | 3/1991 | Hayashi et al. |
| 5,053,482 A | 10/1991 | Tietz |
| 5,070,178 A | 12/1991 | Yamada |
| 5,097,004 A | 3/1992 | Gallagher et al. |
| 5,097,005 A | 3/1992 | Tietz |
| 5,110,844 A | 5/1992 | Hayashi et al. |
| 5,116,881 A | 5/1992 | Park et al. |
| 5,128,185 A | 7/1992 | Greene |
| 5,128,383 A | 7/1992 | Amano et al. |
| 5,134,028 A | 7/1992 | Hayashi et al. |
| 5,164,478 A | 11/1992 | Lee et al. |
| 5,171,308 A | 12/1992 | Gallagher et al. |
| 5,171,309 A | 12/1992 | Gallagher et al. |
| 5,219,646 A | 6/1993 | Gallagher et al. |
| 5,256,711 A | 10/1993 | Tokiwa et al. |
| 5,288,781 A | 2/1994 | Song et al. |
| 5,290,631 A | 3/1994 | Fleury et al. |
| 5,292,783 A | 3/1994 | Buchanan et al. |
| 5,295,985 A | 3/1994 | Romesser et al. |
| 5,300,572 A | 4/1994 | Tajima et al. |
| 5,324,794 A | 6/1994 | Taka et al. |
| 5,331,066 A | 7/1994 | Takanoo et al. |
| 5,349,028 A | 9/1994 | Takahashi et al. |
| 5,354,616 A | 10/1994 | Fish, Jr. et al. |
| 5,369,210 A | 11/1994 | George et al. |
| 5,391,700 A | 2/1995 | Itoh et al. |
| 5,407,981 A | 4/1995 | Kim et al. |
| 5,446,079 A | 8/1995 | Buchanan et al. |
| 5,530,058 A | 6/1996 | Imaizumi et al. |
| 5,559,171 A | 9/1996 | Buchanan et al. |
| 5,580,911 A | 12/1996 | Buchanan et al. |
| 5,593,778 A | 1/1997 | Kondo et al. |
| 5,594,076 A | 1/1997 | Gordon, III et al. |
| 5,599,858 A | 2/1997 | Buchanan et al. |
| 5,616,681 A | 4/1997 | Itoh et al. |
| 5,653,930 A | 8/1997 | Noda et al. |
| 5,661,193 A | 8/1997 | Khemani |
| 5,709,940 A | 1/1998 | George et al. |
| 5,714,569 A | 2/1998 | Imaizumi et al. |
| 5,780,368 A | 7/1998 | Noda et al. |
| 5,786,408 A | 7/1998 | Kuroda et al. |
| 5,849,822 A | 12/1998 | Kido et al. |
| 5,882,780 A | 3/1999 | Yamamura et al. |
| 5,922,782 A | 7/1999 | Khemani |
| 5,936,045 A * | 8/1999 | Warzelhan et al. .......... 525/437 |
| 5,958,567 A | 9/1999 | Wakabayashi et al. |
| 6,018,004 A | 1/2000 | Warzelhan et al. |
| 6,020,393 A | 2/2000 | Khemani |
| 6,046,248 A * | 4/2000 | Warzelhan et al. .......... 521/138 |
| 6,046,302 A | 4/2000 | Buning et al. |
| 6,083,621 A | 7/2000 | Sugimoto |
| 6,096,809 A | 8/2000 | Lorcks et al. |
| 6,162,890 A | 12/2000 | George et al. |
| 6,187,422 B1 | 2/2001 | Murschall et al. |
| 6,242,560 B1 | 6/2001 | Gyobu et al. |
| 6,255,443 B1 | 7/2001 | Kinkelin et al. |
| 6,258,924 B1 * | 7/2001 | Warzelhan et al. .......... 528/272 |
| 6,297,347 B1 * | 10/2001 | Warzelhan et al. .......... 528/272 |
| 6,342,304 B1 | 1/2002 | Buchanan et al. |
| 6,787,245 B1 * | 9/2004 | Hayes ........................ 428/480 |
| 7,144,632 B2 * | 12/2006 | Hayes ..................... 428/423.7 |
| 2005/0171250 A1* | 8/2005 | Hayes ........................ 524/47 |

* cited by examiner

SULFONATED ALIPHATIC-AROMATIC COPOLYETHERESTERS

FIELD OF THE INVENTION

This invention relates to copolyetheresters. More particularly, this invention relates to sulfonated aliphatic-aromatic copolyetheresters that have advantageous thermal properties and are biodegradable.

BACKGROUND OF THE INVENTION

The inadequate treatment of municipal solid waste which is being put in landfills and the increasing addition of nondegradable materials, including plastics, to municipal solid waste streams are combining to drastically reduce the number of landfills available and to increase the costs of municipal solid waste disposal. While recycling of reusable components of the waste stream is desirable in many instances, the costs of recycling and the infrastructure required to recycle materials is sometimes prohibitive. In addition, there are some products which do not easily fit into the framework of recycling. The composting of nonrecyclable solid waste is a recognized and growing method to reduce solid waste volume for landfilling and/or making a useful product from the waste to improve the fertility of fields and gardens. One of the limitations to marketing such compost is the visible contamination by undegraded plastic, such as film or fiber fragments.

It is desired to provide components which are useful in disposable products and which are degraded into less contaminating forms under the conditions typically existing in waste composting processes. These conditions may involve temperatures no higher than 70° C., and averaging in the 55-60° C. range, humid conditions as high as 100 percent relative humidity, and exposure times which range from weeks to months. It is further desirable to provide disposable components which will not only degrade aerobically/anaerobically in composting, but will continue to degrade in the soil or landfill. As long as water is present, they will continue to break down into low molecular weight fragments which can be ultimately biodegraded by microorganisms completely into biogas, biomass, and liquid leachate, as for natural organics like wood.

Polyesters have been considered for biodegradable articles and enduses in the past. These biodegradable polyesters can be described as belonging to three general classes: aliphatic polyesters; aliphatic-aromatic polyesters; and sulfonated aliphatic-aromatic polyesters.

Aliphatic polyesters include polyesters derived solely from aliphatic dicarboxylic acids, such as poly(ethylene succinate), poly(1,4-butylene adipate), and the like, as well as poly(hydroxyalkanates), such as polyhydroxybutyrate, polylactide, polycaprolactone, polyglycolide, and the like. U.S. Pat. No. 3,932,319 to Clendinning et al. teaches the use of biodegradable aliphatic polyesters, such as poly(ethylene adipate), in biodegradable blends. U.S. Pat. No. 4,076,798 to Casey et al. teaches biodegradable resins derived from diglycollic acid and an unhindered glycol. U.S. Pat. No. 5,256,711 to Tokiwa et al. discloses a biodegradable plastic material which is a mixture of gelatinized starch and biodegradable, aliphatic polyesters. U.S. Pat. Nos. 5,292,783, 5,559,171, 5,580,911, and 5,599,858 to Buchanan et al. teach biodegradable blends of certain cellulose derivatives with aliphatic polyesters, aliphatic-aromatic polyesters, and combinations thereof. U.S. Pat. No. 5,300,572 to Tajima et al. discloses a process to produce high molecular weight, biodegradable aliphatic polyesters. U.S. Pat. No. 5,324,794 to Taka et al. discloses biodegradable films, U.S. Pat. No. 5,349,028 to Takahashi discloses biodegradable fiber, and U.S. Pat. No. 5,530,058 to Imaizumi discloses biodegradable filled compositions from the above mentioned aliphatic polyester. U.S. Pat. Nos. 5,391,700 and 5,616,681 to Itoh et al. teach a process to produce an aliphatic polyester. U.S. Pat. Nos. 5,653,930 and 5,780,368 to Noda et al. disclose processes to produce biodegradable fibrils from polyhydroxyalkanoates. U.S. Pat. No. 5,714,569 to Imaizumi et al. discloses branched aliphatic polyester compositions. U.S. Pat. No. 5,786,408 to Kuroda et al. teaches biodegradable compositions which include a polylactone resin, an aliphatic polyester resin, and an aliphatic polyisocyanate compound. U.S. Pat. No. 6,083,621 to Sugimoto teaches biodegradable aliphatic polyester compositions which are filled with a dried powder of fine fibers of a coconut mesocarp.

Aliphatic-aromatic polyesters include polyesters derived from a mixture of aliphatic dicarboxylic acids and aromatic dicarboxylic acids. U.S. Pat. No. 3,948,859 to Sublett et al. teaches hot melt adhesive compositions which comprise a copolyester derived from 75-95 mole percent terephthalic acid, 5-25 mole percent adipic acid, 55-85 mole percent of 1,6-hexanediol, and about 15-45 mole percent ethylene glycol. U.S. Pat. No. 4,166,895 to Buxbaum et al. discloses copolyesters of 1,4-butanediol with 8-12 mole percent of a saturated dicarboxylic acid having 6 to 36 carbon atoms, 26-32 mole percent of terephthalic acid, and 7.5 to 12 mole percent isophthalic acid. U.S. Pat. No. 4,328,059 to Horlbeck et al. teaches a process to produce polyesters by condensing 40-85 mole percent of terephthalic acid, optionally half of which component can be replaced with another dicarboxylic acid, 60-15 mole percent adipic acid, with an alkanediol of 2-6 carbon atoms in its carbon chain. U.S. Pat. No. 4,419,507 to Sublett teaches copolyesters derived from 100 mole percent of a dibasic acid component comprising 40-100 mole percent terephthalic acid and 0-60 mole percent of a second dicarboxylic acid containing 3-12 carbon atoms and 100 mole percent of glycol component comprising 40-100 mole percent 1,4-butanediol, and 0-60 mole percent di(ethylene glycol). Representative of the copolyesters disclosed in this patent is the polyester prepared from 50 mole percent glutaric acid and 50 mole percent of terephthalic acid with 1,4-butanediol.

U.S. Pat. No. 5,446,079 to Buchanan et al. teaches biodegradable aliphatic-aromatic copolyesters which comprise 40-60 mole percent of aliphatic dicarboxylic acids selected from the group consisting of glutaric acid and adipic acid, and 60-40 mole percent of aromatic dicarboxylic acids with 8 to 12 carbon atoms with diols selected from the group consisting of 1,4-butanediol and 1,6-hexanediol. U.S. Pat. No. 5,594,076 to Gordon et al. discloses hydrodegradable copolyester consisting essentially of a substantially non-degradable aromatic polyester and a hydrodegradable oxalate subunit. U.S. Pat. Nos. 5,661,193 and 6,020,393 to Khemani teach foamable, biodegradable aliphatic-aromatic copolyesters which include a branching agent. U.S. Pat. No. 6,096,809 to Lorcks et al. teaches biodegradable compositions consisting of blends of thermoplastic starch with, for example, aliphatic-aromatic polyesters. U.S. Pat. No. 6,342,304 to Buchanan et al. discloses uniaxially or biaxially oriented films prepared from aliphatic-aromatic copolyesters.

Polyetheresters include polyesters which incorporate poly(alkylene ether) glycols, such as poly(ethylene glycol), poly(trimethylene ether glycol), poly(tetramethylene ether)glycol, and the like. Polyetherester compositions are known within the art. See, for example, U.S. Pat. Nos. 2,744,087, 3,243,413, 3,558,557, 3,880,976, 4,256,860, 4,349,469, 4,355,155, 4,840,984, 4,906,729, 4,937,314, 4,968,778, 4,970,275, 4,985,536, 5,128,185, 5,331,066, and 6,046,302.

Aliphatic-aromatic polyetheresters include polyesters derived from a mixture of aliphatic dicarboxylic acids and aromatic dicarboxylic acids which incorporate poly(alkylene ether) glycols. Aliphatic aromatic polyetheresters are generally known within the art. See, for example, U.S. Pat. Nos. 3,023,192, 3,261,812, 3,663,653, 3,701,755, 3,763,109, 3,766,146, 3,775,373, 3,775,374, 3,775,375, 3,784,520, 3,801,547, 4,003,882, 4,003,883, 4,136,715, 4,250,280, 4,262,114, 4,467,595, 4,670,498, 4,687,835, 4,929,714, 5,882,780, and 5,958,567.

U.S. Pat. No. 3,103,914 to Willard exemplifies aliphatic aromatic polyetheresters, for example, containing 85 mole percent ethylene glycol, 15 mole percent poly(tetramethylene oxide)glycol with an average molecular weight of 1005, 85 mole percent terephthalic acid, and 15 mole percent sebacic acid (Example 1), and 90 mole percent ethylene glycol, 10 mole percent poly(tetramethylene oxide)glycol with an average molecular weight of 1005, 70 mole percent terephthalic acid, and 30 mole percent sebacic acid.

U.S. Pat. No. 3,651,014 to Witsiepe exemplifies aliphatic aromatic polyetherester compositions containing 82.4 mole percent 1,4-butanediol, 17.6 mole percent poly(tetramethylene oxide)glycol, 80 mole percent terephthalic acid, and 20 mole percent adipic acid. (See, column 13, line 1, Example 5.)

U.S. Pat. No. 3,981,833 to Lark exemplifies aliphatic aromatic polyetherester compositions consisting of, for example, 44.4 mole percent polyethylene glycol with an average molecular weight of 600, 44.4 mole percent neopentyl glycol, 11.1 mole percent 1,1,1-trimethylolpropane triol, 83 mole percent isophthalic acid, and 17 mole percent adipic acid. (See, Example 1.)

U.S. Pat. No. 4,156,774 to Buxbaum et al. exemplifies aliphatic aromatic polyetherester compositions which contain, for example, 55 mole percent ethylene glycol, 40 mole percent diethylene glycol, 5 mole percent poly(tetramethylene oxide) glycol, 90 mole percent terephthalic acid, and 10 mole percent azelaic acid. (See, Example 2.)

U.S. Pat. No. 4,328,278 to Sublett exemplifies the preparation of a resin composed of 70 mole percent 1,6-hexanediol, 30 mole percent diethylene glycol, 90 mole percent terephthalic acid, and 10 mole percent glutaric acid. U.S. Pat. No. 4,390,687 to Tung exemplifies aliphatic aromatic polyetherester compositions consisting of: (i) 88.7 mole percent 1,4-butanediol, 11.3 mole percent of poly(tetramethylene oxide) glycol having an average molecular weight of 1000, 86.8 mole percent terephthalic acid, and 13.2 mole percent dimer acid (Example 3); (ii) 90.1 mole percent 1,4-butanediol, 9.9 mole percent of poly(tetramethylene oxide)glycol having an average molecular weight of 1000, 95.4 mole percent terephthalic acid, and 4.6 mole percent dimer acid (Example 4); and (iii) 98 mole percent 1,4-butanediol, 2 mole percent of poly (tetramethylene oxide)glycol having an average molecular weight of 1000, 99.5 mole percent terephthalic acid, and 0.5 mole percent dimer acid (Example 7). U.S. Pat. Nos. 4,419, 507 to Sublett, 4,576,997 to Trotter et al., and 4,966,959 to Cox et al. exemplify aliphatic-aromatic polyetheresters which incorporate diethylene glycol.

U.S. Pat. No. 4,328,333 to Barbee et al. exemplifies aliphatic aromatic polyetherester compositions which are comprised of: (i) 96.3 mole percent 1,4-butanediol, 3.7 mole percent of a polypropylene ether glycol, 69.4 mole percent terephthalic acid, 30 mole percent adipic acid, and 0.6 mole percent trimellitic acid (Example 6); and (ii) 96.3 mole percent 1,4-butanediol, 3.7 mole percent of a polypropylene ether glycol, 69.4 mole percent terephthalic acid, 30 mole percent 1,12-dodecanedioc acid, and 0.6 mole percent trimellitic acid (Example 7).

U.S. Pat. No. 4,598,142 to Hilbert et al. exemplifies aliphatic aromatic polyetheresters which contain, for example, 55 mole percent 1,4-butanediol, 45 mole percent diethylene glycol, 70 mole percent terephthalic acid, and 30 mole percent glutaric acid (Example 2), which was reported to have a crystalline melting temperature of 108.6° C.

U.S. Pat. No. 6,255,443 to Kinkelin et al. exemplifies aliphatic aromatic polyetherester compositions which contain: (i) 48 mole percent 1,4-butanediol, 46 mole percent 1,6-hexanediol, 6 mole percent polyethylene glycol with an average molecular weight of 600, 70 mole percent terephthalic acid and 30 mole percent adipic acid, reported to have a melting point of 78° C. (Example 1); (ii) 48 mole percent 1,4-butanediol, 46 mole percent 1,6-hexanediol, 6 mole percent polyethylene glycol with an average molecular weight of 600, 80 mole percent terephthalic acid, and 20 mole percent adipic acid, reported to have a melting point of 89° C. (Example 2); and (iii) 44 mole percent 1,4-butanediol, 50 mole percent 1,6-hexanediol, 6 mole percent polyethylene glycol with an average molecular weight of 600, 70 mole percent terephthalic acid, and 30 mole percent adipic acid, reported to have a melting point of 79° C. (Example 3).

U.S. Pat. Nos. 5,936,045, 6,046,248, 6,258,924, and 6,297, 347 to Warzelhan et al. exemplify aliphatic aromatic polyetherester compositions. For example, U.S. Pat. No. 6,258, 924 to Warzelhan et al. exemplifies aliphatic aromatic polyetherester compositions which contain: (i) 80 mole percent 1,4-butanediol, 20 mole percent polyethylene glycol with an average molecular weight of 600, 70 mole percent terephthalic acid, and 30 mole percent adipic acid, reported to have a melting point of 127.5° C. (Example 2); and (ii) 75 mole percent 1,4-butanediol, 25 mole percent polyethylene glycol with an average molecular weight of 600, 69.8 mole percent terephthalic acid, and 30.2 mole percent adipic acid, reported to have a melting point of 111° C. (Example 4).

Sulfonated aliphatic-aromatic polyesters include polyesters derived from a mixture of aliphatic dicarboxylic acids and aromatic dicarboxylic acids and, in addition, incorporate a sulfonated monomer, such as the salts of 5-sulfoisophthalic acid. U.S. Pat. No. 3,563,942 to Heilberger teaches aqueous dispersions of solvent soluble linear sulfonated aliphatic-aromatic copolyesters which incorporate from 0.1 to 10 mole percent of the sulfonated aromatic monomer. U.S. Pat. No. 3,634,541 to Popp et al. discloses fiber-forming sulfonated aliphatic-aromatic copolyesters which include 0.1 to 10 mole percent of xylylene sulfonated salt monomers. U.S. Pat. No. 3,779,993 to Kibler et al. teaches linear, water-dissipatable sulfonated aliphatic-aromatic copolyesters which incorporate 2 to 12.5 mole percent of a sulfomonomer.

U.S. Pat. No. 4,104,262 to Schade teaches low molecular weight, water dispersible polyesters which incorporate 1-5 mole percent of an alkali metal-sulfo group. U.S. Pat. No. 4,340,519 to Kotera et al. discloses crystalline and non-crystalline sulfonated aliphatic-aromatic copolyesters which incorporate 0.5 to 10 mole percent of an aromatic dicarboxylic acid having a metal sulfonate group. U.S. Pat. No. 4,390, 687 to Tung teaches elastomeric aliphatic-aromatic copolyester compositions which incorporate 0.1-5.0 mole percent of an ionic metal sulfonate compound. U.S. Pat. Nos. 4,476,189, 4,525,419, and 4,585,687 to Posey et al. disclose water dispersible aliphatic-aromatic copolyesters which incorporate 6-15 mole percent of at least one sulfomonomer containing an alkali metal sulfonate group.

U.S. Pat. No. 5,171,308 to Gallagher et al. discloses compostable aliphatic-aromatic copolyesters consisting of 5 to 40 mole percent of a $C_2$ to $C_{12}$ aliphatic diacid, with at least 85 mole percent of the remaining acid component being terephthalic acid, and 1 to 30 mole percent of di(ethylene glycol) and tri(ethylene glycol), with the remainder of the glycol component being chosen from the group consisting of ethylene glycol, 1,3-propanediol, and 1,4-butanediol, along with 0.1 to 2.5 mole percent of the polyester being composed of moieties comprising alkali or alkaline metal sulfo groups. U.S. Pat. No. 5,171,309 to Gallagher et al. teaches biodegradable sulfonated aliphatic-aromatic copolyesters which incorporate 10-40 mole percent hexahydroterephthalic acid along with 0.1 to 2.5 mole percent of moieties comprising alkali or alkaline metal sulfo groups. U.S. Pat. No. 5,219,646 to Gallagher et al. discloses compostable products of blends of starch with certain aliphatic aromatic polyesters which comprise up to 20 mole percent di(ethylene glycol), 0.1 to 15 mole percent alkali metal or alkaline earth metal sulfo groups, 10 to 40 mole percent aliphatic diacids, such as adipic or glutaric acid, ethylene glycol, and 45 to 89.9 mole percent terephthalic acid. Further, U.S. Pat. No. 5,295,985 to Romesser et al. teaches copolyesters of the above mentioned sulfonated aliphatic-aromatic copolyester composition which incorporate 0.1 to 2.5 mole percent of an alkali metal or alkaline earth metal salt of a 4-sulfophthalic radical with additionally 0 to 0.4 mole fraction of a polyester derived from hydroxy acids. U.S. Pat. Nos. 6,018,004 and 6,297,347 to Warzelhan et al. disclose certain biodegradable aliphatic-aromatic copolyesters which may contain 0 to 5 mole percent of a sulfonate compound.

Sulfonated polyetheresters include polyester compositions which include both poly(alkylene ether) glycols, such as poly (ethylene glycol), poly(trimethylene glycol), poly(tetramethylene glycol), and the like, and, in addition, sulfonated monomers, such as the salts of 5-sulfoisophthalic acid. Sulfonated polyetherester compositions have been taught within the art. See, for example, U.S. Pat. Nos. 3,959,213, 4,022,740, 4,119, 680, 4,217,441, 5,053,482, 5,097,004, 5,097,005, 5,354,616, 4,006,123, 4,604,446, 5,288,781, 5,290,631, and 5,849,822.

Sulfonated aliphatic-aromatic polyetheresters include polyester compositions which include poly(alkylene ether) glycols, sulfonated monomers, and a mixture of aliphatic dicarboxylic acids and aromatic dicarboxylic acids. Sulfonated aliphatic-aromatic polyetherester compositions have been generally taught within the art. See, for example, U.S. Pat. Nos. 3,779,993, 4,251,652, 4,295,652, 4,315,882, 4,483, 976, 4,600,743, 5,070,178, 5,171,308, 5,171,309, 5,219,646, 5,295,985, 5,407,981, 5,593,778, 5,709,940, 6,162,890, and 6,242,560.

U.S. Pat. No. 4,340,519 to Kotera et al. exemplifies sulfonated aliphatic aromatic polyetherester compositions which consist of 25 mole percent ethylene glycol, 70 mole percent 1,4-butanediol, 5 mole percent polytetramethylene glycol (MW=1000), 65 mole percent terephthalic acid, 28 mole percent adipic acid, and 7 mole percent 5-sodium sulfoisophthalic acid. (See, Table 2, Entry A-3.) Said resin was reported to have a melting point of 110° C.

U.S. Pat. No. 4,390,687 to Tung exemplifies sulfonated aliphatic aromatic polyetherester compositions which consist of: (i) 88.7 mole percent 1,4-butanediol, 11.3 mole percent of poly(tetramethylene oxide)glycol having an average molecular weight of 1000, 84.8 mole percent terephthalic acid, 13.2 mole percent dimer acid, and 2 mole percent dimethyl sodium sulfoisophthalate (Example 1); (ii) 88.7 mole percent 1,4-butanediol, 11.3 mole percent of poly(tetramethylene oxide) glycol having an average molecular weight of 1000, 85.8 mole percent terephthalic acid, 13.2 mole percent dimer acid (i.e., dimerized unsaturated fatty acids), and 1 mole percent dimethyl sodium sulfoisophthalate (Example 2); (iii) 90.1 mole percent 1,4-butanediol, 9.9 mole percent of poly(tetramethylene oxide)glycol having an average molecular weight of 1000, 94.4 mole percent terephthalic acid, 4.6 mole percent dimer acid, and 1 mole percent dimethyl sodium sulfoisophthalate (Example 5); (iv) 90.1 mole percent 1,4-butanediol, 9.9 mole percent of poly(tetramethylene oxide) glycol having an average molecular weight of 1000, 93.4 mole percent terephthalic acid, 4.6 mole percent dimer acid, and 2 mole percent dimethyl sodium sulfoisophthalate (Example 6); and (v) 98 mole percent 1,4-butanediol, 2 mole percent of poly(tetramethylene oxide)glycol having an average molecular weight of 1000, 98.5 mole percent terephthalic acid, 0.5 mole percent dimer acid, and 1 mole percent dimethyl sodium sulfoisophthalate (Example 8).

U.S. Pat. No. 4,598,142 to Hilbert et al. exemplifies sulfonated aliphatic aromatic polyetheresters which contain, for example, 59.2 mole percent 1,4-butanediol, 40.8 mole percent diethylene glycol, 65 mole percent terephthalic acid, 5 mole percent sodium 5-sulfoisophthalic acid, and 30 mole percent glutaric acid (Example 1), which was reported to have a crystalline melting point of 92° C.

U.S. Pat. No. 5,171,308 to Gallagher et al. exemplifies sulfonated aliphatic aromatic polyetheresters which contain: (i) 86 mole percent ethylene glycol, 7 mole percent diethylene glycol, 7 mole percent polyethylene glycol, 81 mole percent terephthalic acid, 17 mole percent glutaric acid, and 2 mole percent sodium 5-sulfoisophthalic acid (Entry B1, Table 1B); (ii) 88 mole percent ethylene glycol, 6 mole percent diethylene glycol, 6 mole percent polyethylene glycol, 86 mole percent terephthalic acid, 12 mole percent glutaric acid, and 2 mole percent sodium 5-sulfoisophthalic acid (Entry B2, Table 1B); and (iii) 90 mole percent ethylene glycol, 5 mole percent diethylene glycol, 5 mole percent polyethylene glycol, 88 mole percent terephthalic acid, 10 mole percent glutaric acid, and 2 mole percent sodium 5-sulfoisophthalic acid (Entry B3, Table 1B).

U.S. Pat. No. 5,369,210 to George et al. exemplifies sulfonated aliphatic-aromatic polyetheresters compositions which contain, for example, 95 mole percent ethylene glycol, 5 mole percent diethylene glycol, 69 mole percent 2,6-naphthalenedicarboxylic acid, 18 mole percent sodium 5-sulfoisophthalic acid, and 13 mole percent sebacic acid (Example 6).

U.S. Pat. Nos. 6,258,924 and 6,297,347 to Warzelhan et al. exemplify sulfonated aliphatic-aromatic polyetherester compositions which contain: (i) 80 mole percent 1,4-butanediol, 20 mole percent polyethylene glycol with an average molecular weight of 1500, 68.7 mole percent terephthalic acid, 29.4 mole percent adipic acid, 1.7 mole percent of sodium 5-sulfoisophthalic acid, and 0.2 mole percent of pyromellitic dianhydride, reported to have a melting point of 107.8° C. (Example 3); and (ii) 54.6 mole percent 1,4-butanediol, 46.4 mole percent diethylene glycol, 70.1 mole percent terephthalic acid, 25.3 mole percent adipic acid, and 4.5 mole percent of sodium 5-sulfoisophthalic acid (Example 5).

International Publication WO 01/19909 A1 to Grutke et al. discloses a biodegradable, thermoplastic molding material which includes at least one biodegradable copolyester and 0.01 to 15 weight percent of a hydrophobically modified phyllosilicate.

A shortcoming of the above mentioned materials is that they do not provide a sulfonated aliphatic-aromatic copolyetherester composition with high temperature characteristics, which are required by many substantial enduses, such as film, dual ovenable food trays and the like.

SUMMARY OF THE INVENTION

The invention provides sulfonated aliphatic-aromatic copolyetheresters with advantageous thermal properties.

One aspect of the invention includes sulfonated aliphatic-aromatic copolyetheresters which incorporate between 0.1 to 4.0 mole percent of a poly(alkylene ether) glycol, and processes to produce same. In another aspect of the invention, the sulfonated aliphatic-aromatic copolyetheresters comprise the polymerization product of 80.0 to 20.0 mole percent of an aromatic dicarboxylic acid or ester thereof based on the total moles of dicarboxylic acid or ester thereof, 20.0 to 80.0 mole percent of an aliphatic dicarboxylic acid or ester thereof based on the total moles of dicarboxylic acid or ester thereof, 0.1 to 10.0 mole percent of a sulfonate component, 99.9 to 91.0 mole percent of a first glycol selected from the group consisting of ethylene glycol, 1,3-propanediol and 1,4-butanediol based on the total moles of glycol, 0.1 to 4.0 mole percent of a poly(alkylene ether) glycol based on the total moles of glycol, 0 to 5.0 mole percent of a second (other) glycol based on the total moles of glycol, and 0 to 5.0 mole percent of a polyfunctional branching agent. The respective mole percentages of the sulfonate component and the polyfunctional branching agent are based on the total moles of dicarboxylic acid or ester when they are diacid comonomers and based on the total moles of glycol when they are glycol (i.e., diol) comonomers. It should be further appreciated that the mole percentages are directed to the relative amounts of the respective diacid residue and gycol residue structures present in the final polymeric compound. As such and as ilustrated in the examples herein, the actual comonomers employed in the polycondensation reaction producing the sulfonated aliphatic-aromatic copolyetherester of the instant invention may already be an esterified condensates of the respective aromatic acid or aliphatic acid with one or more glycol, or the like. Thus the computation of the actual mole percentage has to take in to consideration the respective cotribution to each of these residue-types present in the resulting copolyetherester. In one embodiment, the sulfonated aliphatic-aromatic copolyetheresters of the invention are biodegradable.

One embodiment of the process for producing the sulfonated aliphatic-aromatic copolyetheresters of the invention comprises reacting an aromatic dicarboxylic acid or ester thereof, an aliphatic dicarboxylic acid or ester thereof, a sulfonate component, a first glycol, and a poly(alkylene ether) glycol to produce the copolyetherester. In another embodiment, the step of reacting further comprises reacting at least one other (second) glycol component and a polyfunctional branching agent. In yet another embodiment, the reacting comprises melt polymerizing (i.e., involves a melt polymerization).

The invention also includes sulfonated aliphatic-aromatic copolyetherester filled compositions that comprise the sulfonated aliphatic-aromatic copolyetheresters of the invention and a filler, and processes to produce the same. The filler content of the filled composition is 0.01 to 80 weight percent based on the weight of the total filled composition. Preferably, the filler of the filled composition comprises an inorganic filler or a clay filler. In one embodiment, the filled composition comprises 0.01 to 80 weight percent filler and 99.99 to 20 weight percent copolyetherester based on the total filled composition. In yet another embodiment, the filled composition is biodegradable.

One embodiment for the process of producing the filled compositions of the invention comprises reacting an aromatic dicarboxylic acid or ester thereof, an aliphatic dicarboxylic acid or ester thereof, a sulfonate component, a first glycol, and a poly(alkylene ether) glycol to produce a copolyetherester of the invention, and adding a filler prior to the reacting, concurrently with the reacting, after the reacting, or a combination thereof to produce the filled composition.

A further aspect of the invention includes shaped articles produced from the sulfonated aliphatic-aromatic copolyetheresters of the invention, and processes to produce the same. Yet a further aspect of the invention includes shaped articles produced from the sulfonated aliphatic-aromatic copolyetherester filled compositions of the invention, and processes to produce the same. The shaped articles of the invention have advantageous thermal properties. The shaped articles of the invention include, for example, film, sheets, fiber, melt blown containers, molded parts, such as cutlery, foamed parts, polymeric melt extrusion coatings onto substrates, polymeric solution coatings onto substrates, and the like.

One embodiment for producing a shaped article of the invention comprises forming a shaped article from a copolyetherester of the invention. Another embodiment for producing a shaped article of the invention comprises forming a shaped article from a filled composition of the invention.

DETAILED DESCRIPTION OF THE INVENTION

The invention includes sulfonated aliphatic-aromatic copolyetheresters and processes to produce the same. Thus the present invention provides a sulfonated aliphatic-aromatic copolyetheresters comprising:

80.0 to 20.0 mole percent of an aromatic dicarboxylic acid residue based on the total moles of dicarboxylic acid residue;

20.0 to 80.0 mole percent of an aliphatic dicarboxylic acid residue based on the total moles of dicarboxylic acid residue;

0.1 to 10.0 mole percent of a sulfonate component residue;

99.9 to 91.0 mole percent of a single glycol residue selected from the group consisting of ethylene glycol residue, 1,3-propanediol residue and 1,4-butanediol residue based on the total moles of glycol residue;

0.1 to 4.0 mole percent of a poly(alkylene ether) glycol residue based on the total moles of glycol residue;

0 to 5.0 mole percent of a second glycol residue based on the total moles of glycol residue; and 0 to 5.0 mole percent of a polyfunctional branching agent residue. Preferably, the copolyetherester is biodegradable.

The aromatic dicarboxylic acid or ester thereof is meant to include unsubstituted and substituted aromatic dicarboxylic acids and the lower alkyl esters of aromatic dicarboxylic acids having from 8 carbons to 20 carbons. Examples of desirable diacid moieties include those derived from terephthalates, isophthalates, naphthalates, and bibenzoates. Specific examples of the desirable aromatic dicarboxylic acid or ester thereof include terephthalic acid, dimethyl terephthalate, isophthalic acid, dimethyl isophthalate, 2,6-napthalene dicarboxylic acid, dimethyl-2,6-naphthalate, 2,7-naphthalenedicarboxylic acid, dimethyl-2,7-naphthalate, 3,4'-diphenyl ether dicarboxylic acid, dimethyl-3,4'-diphenyl ether dicarboxylate, 4,4'-diphenyl ether dicarboxylic acid, dimethyl-4,4'-diphenyl ether dicarboxylate, 3,4'-diphenyl sulfide dicarboxylic acid, dimethyl-3,4'-diphenyl sulfide dicarboxylate, 4,4'-diphenyl sulfide dicarboxylic acid, dimethyl-4,4'-diphenyl sulfide dicarboxylate, 3,4'-diphenyl sulfone dicarboxylic acid, dimethyl-3,4'-diphenyl sulfone dicarboxylate, 4,4'-diphenyl sulfone dicarboxylic acid, dimethyl-4,4'-diphenyl sulfone dicarboxylate, 3,4'-benzophenonedicarboxylic acid, dimethyl-3,4'-benzophenonedicarboxylate, 4,4'-benzophenonedicarboxylic acid, dimethyl-4,4'-benzophenonedicarboxylate, 1,4-naphthalene dicarboxylic acid, dimethyl-1,4-naphthalate, 4,4'-methylene bis(benzoic acid), dimethyl-4,4'-methylenebis(benzoate), and the like and mixtures derived therefrom. Preferably, the aromatic dicarboxylic acid or ester thereof is derived from terephthalic acid, dimethyl terephthalate, isophthalic acid, dimethyl isophthalate, 2,6-naphthalene dicarboxylic acid, dimethyl-2,6-naphthalate, and mixtures derived therefrom. This should not be considered limiting. Essentially any aromatic dicarboxylic acid known in the art may find utility within the invention. Preferably, the sulfonated aliphatic-aromatic copolyetheresters of the invention should include between 80 and 50 mole percent of the aromatic dicarboxylic acid or ester thereof based on the total moles of dicarboxylic acid or ester thereof.

The aliphatic dicarboxylic acid or ester thereof is meant to include unsubstituted, substituted, linear, and branched, aliphatic dicarboxylic acids, and the lower alkyl esters of aliphatic dicarboxylic acids having 2 to 36 carbon atoms. Specific examples of desirable aliphatic dicarboxylic acid or ester thereof include, oxalic acid, dimethyl oxalate, malonic acid, dimethyl malonate, succinic acid, dimethyl succinate, methylsuccinc acid, glutaric acid, dimethyl glutarate, 2-methylglutaric acid, 3-methylglutaric acid, adipic acid, dimethyl adipate, 3-methyladipic acid, 2,2,5,5-tetramethylhexanedioic acid, pimelic acid, suberic acid, azelaic acid, dimethyl azelate, sebacic acid, 1,11-undecanedicarboxylic acid, 1,10-decanedicarboxylic acid, undecanedioic acid, 1,12-dodecanedicarboxylic acid, hexadecanedioic acid, docosanedioic acid, tetracosanedioic acid, dimer acid, and the like and mixtures derived therefrom. Preferably, the aliphatic dicarboxylic acid or ester thereof is selected from the group of succinc acid, dimethyl succinate, glutaric acid, dimethyl glutarate, adipic acid, dimethyl adipate, and mixtures thereof. This should not be considered limiting. Essentially any aliphatic dicarboxylic acid known within the art may find utility within the invention. Preferably, the sulfonated aliphatic-aromatic copolyetheresters of the invention should include between 20 and 50 mole percent of said aliphatic dicarboxylic acid or ester thereof based on the total moles of dicarboxylic acid or ester thereof.

The aliphatic-aromatic copolyetherester is a sulfonated aliphatic-aromatic copolyetherester and, thus, contains sulfo groups. The amount of sulfonate component, also referred to as sulfo groups or sulfo group containing component, in the resulting copolyetherester should be about 0.1 to 10.0 mole percent. The sulfo groups may be introduced in aliphatic or aromatic monomers or may be introduced as endgroups. When the monomer or end group is a diacid the percentage is based total mole percent of diacid derived groups or residues in the resulting polymer. Similarly, when the monomer or end group containing the sulfo group is a glycol or diol the percentage is based total mole percent of glycol derived groups or residues in the resulting polymer. The sulfo group can be in the acid form or a derivative thereof such as a metal salt (sulfonate). An example of an aliphatic sulfonate is the metal salts of sulfosuccinic acid. Specific examples of aromatic sulfonate components which would find utility as endgroups include the metal salts of 3-sulfobenzoic acid, 4-sulfobenzoic acid, 5-sulfosalicylic acid. Preferred are sulfonate components whereby the sulfonate salt group is attached to an aromatic dicarboxylic acid. Said aromatic nucleus may be benzene, naphthalene, diphenyl, oxydiphenyl, sulfonyldiphenyl, methylenediphenyl, or the like. Preferably, the sulfonate monomer is the residue of a sulfonate-substituted phthalic acid, terephthalic acid, isophthalic acid, 2,6-naphthalenedicarboxylic acid. Most preferably, the sulfonate component is metal salt of 5-sulfoisophthalic acid or the lower alkyl esters of 5-sulfoisophthalate. The metal salt may be monovalent or polyvalent alkali metal ions, alkaline earth metal ions, or other metal ions and the like. The alkali metal ion is preferably, for example, sodium, potassium, or lithium. However, alkaline earth metals such as magnesium are also useful. Other useful metal ions include the transition metal ions, such as zinc, cobalt, or iron. The multivalent metal ions may be used when an increase in the melt viscosity of the sulfonated aliphatic-aromatic copolyetheresters of the inventions is desired. End-use examples where such melt viscosity enhancements may prove useful is melt extrusion coatings, melt blown containers or film, and foam. As little as 0.1 mole percent of the sulfo group contributes significantly to the property characteristics of the resultant films or coatings. Preferably, the sulfo group-containing component is in the 0.1 to 4.0 mole percent incorporation level within the sulfonated aliphatic-aromatic copolyetheresters of the invention.

The first and predominant glycol used in the present invention involves ethylene glycol, 1,3-propanediol or 1,4-butanediol. Conveniently this moeity, because of volatiliy and/or low boiling point, can be incorporated with one or more of the dicarboxylic acid components by esterification or equivalent reaction. Consequently and as exemplified herein, one or more of the monomers employed in the [polycondensation reaction may be an ethylene glycol/dicarboxylic acid ester wherein the ethylene glycol residue and the dicarboxyliuc acid residue is in part attributable to a single comonomer.

The poly(alkylene ether)glycol used herein may have a molecular weight in the range of about 500 to about 4000. Specific examples of poly(alkylene ether)glycols useful within the invention include, for example, poly(ethylene glycol), poly(1,3-propylene glycol), poly(1,4-butylene glycol), (polytetrahydrofuran), poly(pentmethylene glycol), poly(hexamethylene glycol), poly(hepthamethylene glycol), poly(ethylene glycol)-block-poly(propylene glycol)-block-poly(ethylene glycol), 4,4'-isopropylidenediphenol ethoxylate (Bisphenol A ethoxylate), 4,4'-(1-phenylethylidene)bisphenol ethoxylate (Bisphenol AP ethoxylate), 4,4'-ethylidenebisphenol ethoxylate (Bisphenol E ethoxylate), bis(4-hydroxyphenyl)methane ethoxylate (Bisphenol F ethoxylate), 4,4'-(1,3-phenylenediisopropylidene)bisphenol ethoxylate (Bisphenol M ethoxylate), 4,4'-(1,4-phenylenediisopropylidene)bisphenol ethoxylate (Bisphenol P ethokylate), 4,4'-sulfonyidiphenol ethoxylate (Bisphenol S ethoxylate), 4,4'-cyclohexylidenebisphenol ethoxylate (Bisphenol Z ethoxylate), and the like and mixtures thereof. This should not be considered limiting. Essentially any poly(alkylene ether) glycol known within the art may find use in the process of the invention.

The other (second and optional) glycol as used herein is meant to include unsubstituted, substituted, straight chain, branched, cyclic aliphatic, aliphatic-aromatic, or aromatic diols having from 2 carbon atoms to 36 carbon atoms. Specific examples of the desirable other glycol include ethylene glycol, 1,3-propanediol, 1,4-butanediol, 1,6-hexanediol, 1,8-octanediol, 1,10-decanediol, 1,12-dodecanediol, 1,14-tetradecanediol, 1,16-hexadecanediol, dimer diol, 4,8-bis(hydroxymethyl)tricyclo[5.2.1.0/2.6] decane, 1,4-cyclohexanedimethanol, isosorbide, di(ethylene glycol), tri(ethylene glycol), and the like and mixtures derived therefrom. This should not be taken as limiting. Essentially any other glycol known within the art may find use within the invention.

The optional polyfunctional branching agent includes any material with three or more carboxylic acid groups, hydroxy grops, or a mixture thereof. Specific examples of the desirable polyfunctional branching agent include 1,2,4-benzenetricarboxylic acid, (trimellitic acid), trimethyl-1,2,4-benzenetricarboxylate, 1,2,4-benzenetricarboxylic anhydride, (trimellitic anhydride), 1,3,5-benzenetricarboxylic acid, 1,2,4,5-benzenetetracarboxylic acid, (pyromellitic acid), 1,2,4,5-benzenetetracarboxylic dianhydride, (pyromellitic anhydride), 3,3',4,4'-benzophenonetetracarboxylic dianhydride, 1,4,5,8-naphthalenetetracarboxylic dianhydride, citric acid, tetrahydrofuran-2,3,4,5-tetracarboxylic acid, 1,3,5-cyclohexanetricarboxylic acid, pentaerythritol, 2-(hydroxymethyl)-1,3-propanediol, 2,2-bis(hydroxymethyl)propionic acid, and the like and mixtures therefrom. This should not be considered limiting. Essentially any polyfunctional material which includes three or more carboxylic acid or hydroxyl functional groups may find use within the invention. The polyfunctional branching agent may be included when higher resin melt viscosity is desired for specific enduses. Examples of said end-uses may include melt extrusion coatings, melt blown films or containers, foam and the like. Preferably, the sulfonated aliphatic-aromatic copolyetheresters of the invention will include 0 to 1.0 mole percent of said polyfunctional branching agent.

A further aspect of the invention are sulfonated aliphatic-aromatic copolyetherester filled compositions that comprise a sulfonated aliphatic-aromatic copolyetherester of the invention and a filler. The filler content of the sulfonated aliphatic-aromatic copolyetherester filled composition should be 0.01 to 80 weight percent of the filled composition. The filler can be selected from inorganic fillers, organic fillers, clay fillers, and combinations thereof.

The inorganic fillers include, for example, gypsum, carbon black, chalk, silicon oxide, aluminum oxide, titanium dioxide, calcium phosphate, lithium fluoride, calcium carbonate, calcium hydroxide, talc, iron oxides, mica, calcium sulfate, barium sulfate, glass beads, hollow glass beads, glass fibers, and the like and mixtures thereof.

The particle size of the inorganic filler may be within a wide range in the invention. As one skilled within the art would appreciate, the filler particle size may be tailored based on the desired use of the sulfonated aliphatic-aromatic copolyetherester filled composition. It is generally preferable that the average diameter of the inorganic filler be less than about 40 microns. It is more preferable that the average diameter of the inorganic filler be less than about 20 microns. However, this should not be considered limiting. The inorganic filler may include particle sizes ranging up to 40 mesh (U.S. Standard) or larger. Mixtures of inorganic filler particle sizes may also be advantageously utilized. For example, mixtures of calcium carbonate fillers with average particle sizes of about 5 microns and of about 0.7 microns may provide better space filling of the filler within the sulfonated aliphatic-aromatic copolyetherester matrix.

The clay fillers used herein include both natural and synthetic clays and untreated and treated clays, such as organoclays and clays which have been surface treated with silanes or stearic acid to enhance the adhesion with the sulfonated aliphatic-aromatic copolyetherester matrix. Specific usable clay materials include, for example, kaolin, smectite clays, magnesium aluminum silicate, bentonite clays, montmorillonite clays, hectorite clays, and the like and mixtures thereof. The clays may be treated with organic materials, such as surfactants, to make them organophilic. Specific commercial examples of usable clay fillers include Gelwhite MAS 100, a commercial product of the Southern Clay Company, which is defined as a white smectite clay (magnesium aluminum silicate); Claytone 2000, a commercial product of the Southern Clay Company, which is defined as a an organophilic smectite clay; Gelwhite L, a commercial product of the Southern Clay Company, which is defined as a montmorillonite clay from a white bentonite clay; Cloisite 30 B, a commercial product of the Southern Clay Company, which is defined as an organphilic natural montmorillonite clay with bis(2-hydroxyethyl) methyl tallow quarternary ammonium chloride salt; Cloisite Na, a commercial product of the Southern Clay Company, which is defined as a natural montmorillonite clay; Garamite 1958, a commercial product of the Southern Clay Company, which is defined as a mixture of minerals; Laponite RDS, a commercial product of the Southern Clay Company, which is defined as a synthetic layered silicate with an inorganic polyphosphate peptiser; Laponite RD, a commercial product of the Southern Clay Company, which is defined as a synthetic colloidal clay; Nanomers, which are commercial products of the Nanocor Company, which are defined as montmorillonite minerals which have been treated with compatibilizing agents; Nanomer 1.24TL, a commercial product of the Nanocor Company, which is defined as a montmorillonite mineral surface treated with amino acids; "P Series" Nanomers, which are commercial products of the Nanocor Company, which are defined as surface modified montmorillonite minerals; Polymer Grade (PG) Montmorillonite PGW, a commercial product of the Nanocor Company, which is defined as a high purity aluminosilicate mineral, sometimes referred to as a phyllosilicate; Polymer Grade (PG) Montmorillonite PGA, a commercial product of the Nanocor Company, which is defined as a high purity aluminosilicate mineral, sometimes referred to as a phyllosilicate; Polymer Grade (PG) Montmorillonite PGV, a commercial product of the Nanocor Company, which is defined as a high purity aluminosilicate mineral, sometimes referred to as a phyllosilicate; Polymer Grade (PG) Montmorillonite PGN, a commercial product of the Nanocor Company, which is defined as a high purity aluminosilicate mineral, sometimes referred to as a phyllosilicate; and the like and mixtures thereof. This should not be considered limiting. Essentially any clay filler known within the art will find utility in the invention.

The particle size of the clay filler may be within a wide range in the invention. As one skilled within the art would appreciate, the filler particle size may be optimized based on the desired use of the sulfonated aliphatic-aromatic copolyetherester filled composition. It is generally preferable if the average diameter of the clay filler be less than about 40 microns. It is more preferable that the average diameter of the clay filler be less than about 20 microns. However, this should not be considered limiting. The clay filler may include particle sizes ranging up to 40 mesh (U.S. Standard) or larger. Mixtures of clay filler particle sizes may also be advantageously utilized. For example, mixtures of clay fillers with average particle sizes of about 5 microns and of about 0.7 microns may provide better space filling of the filler within the sulfonated aliphatic-aromatic copolyetherester matrix.

Some of the desirable clay fillers of the invention may exfoliate through the process to provide nanocomposites. This is especially true for the layered silicate clays, such as smectite clays, magnesium aluminum silicate, bentonite clays, montmorillonite clays, hectorite clays, and the like. As discussed above, such clays may be natural or synthetic, treated or not. This should not be considered limiting. The clay particle size in the final sulfonated aliphatic aromatic copolyetherester filled composition may be within a wide range.

To give the desired physical properties, the sulfonated aliphaticaromatic copolyetheresters of the invention should have an inherent viscosity, which is an indicator of molecular weight, of at least equal to or greater than 0.15. More desirably, the inherent viscosity (IV) of the sulfonated aliphatic-aromatic copolyetheresters will be at least equal to 0.35 dL/g, as measured on a 0.5 percent (weight/volume) solution of the sulfonated aliphatic-aromatic copolyetherester in a 50:50 (weight) solution of trifluoroacetic acid:dichloromethane solvent system at room temperature. These inherent viscosities will be sufficient for some applications. Higher inherent viscosities are desirable for many other applications, such as films, bottles, sheet, molding resin, and the like. The polymerization conditions may be adjusted to obtain the desired inherent viscosities up to at least about 0.5 and desirably higher than 0.65 dL/g. Further processing of the sulfonated aliphatic-aromatic copolyetherester may achieve inherent viscosities of 0.7, 0.8, 0.9, 1.0, 1.5, 2.0 dL/g, and even higher.

The molecular weight is normally not measured directly. Instead, the inherent viscosity of the polymer in solution or the melt viscosity is used as an indicator of molecular weight. The inherent viscosities are an indicator of molecular weight for comparisons of samples within a polymer family, such as poly(ethylene terephthalate), poly(butylene terephthalate), etc., and are used as the indicator of molecular weight herein.

The sulfonated aliphatic-aromatic copolyetheresters of the invention may be prepared by conventional polycondensation techniques. The compositions may vary somewhat based on the method of preparation used, particularly in the amount of diol that is present in the polymer. These methods include the reaction of the diol monomers with the acid chlorides. For example, acid chlorides of the aromatic dicarboxylic acid component, acid chlorides of the aliphatic dicarboxylic acid component, and acid chlorides of the sulfonate component, may be combined with the glycol, the poly(alkylene ether) glycol, and the other glycol in a solvent, such as toluene, in the presence of a base, such as pyridine, which neutralizes the hydrochloric acid as it is produced. Such procedures are known. See, for example, R. Storbeck, et al., in J. Appl. Polymer Science, Vol. 59, pp. 1199-1202 (1996). Other well known variations using acids chlorides may also be used, such as the interfacial polymerization method, or the monomers may simply be stirred together while heating.

When the sulfonated aliphatic-aromatic copolyetherester is made using acid chlorides, the ratio of the monomer units in the resulting sulfonated aliphatic-aromatic copolyetherester is about the same as the ratio of reacting monomers. Therefore, the ratio of monomers charged to the reactor is about the same as the desired ratio in the product. A stoichiometric equivalent of the diol components and the diacid components generally will be used to obtain a high molecular weight polymer.

Preferably, the sulfonated aliphatic-aromatic copolyetheresters of the invention will be produced through a melt polymerization method. In the melt polymerization method, the aromatic dicarboxylic acid (either as acids, esters, or mixtures thereof), the aliphatic dicarboxylic acid (either as acids, esters, or mixtures thereof), the sulfonate component, the first glycol, the poly(alkylene ether) glycol, the other glycol and, if present, the optional polyfunctional branching agent are combined in the presence of a catalyst to a high enough temperature that the monomers combine to form esters and diesters, then oligomers, and finally polymers. The polymeric product at the end of the polymerization process is a molten product. Generally, the ethylene glycol, 1,3-propanediol, or 1,4-butanediol and the other glycol are volatile and distill from the reactor as the polymerization proceeds. Such procedures are generally known within the teachings of the art.

The melt process conditions of the invention, particularly the amounts of monomers used, depend on the composition of the sulfonated aliphatic-aromatic copolyetherester that is desired. The amount of poly(alkylene ether) glycol, first glycol, second glycol, aromatic dicarboxylic acid or ester thereof, aliphatic dicarboxylic acid or ester thereof, sulfonate component and, if present, chain branching agent are desirably chosen so that the sulfonated aliphatic-aromatic copolyetherester product contains the desired amount of the various monomer units, desirably with equimolar amounts of monomer units derived from the respective diol and diacid components. Because of the volatility of some of the monomers, especially some of the glycol components, and depending on such variables as whether the reactor is sealed (i.e., is under pressure), the polymerization temperature ramp rate, and the efficiency of the distillation columns used in synthesizing the polymer, some of the monomers may need to be included in excess at the beginning of the polymerization reaction and removed by distillation as the reaction proceeds. This is particularly true of the glycol components.

The exact amount of monomers to be charged to a particular reactor is readily determined by a skilled practitioner, but often will be in the ranges below. Excesses of the diacid components, the first glycol component (ethylene glycol, 1,3-propanediol, or 1,4-butanediol), and the other glycol component are often desirably charged, and the excess diacid components, the first glycol component (ethylene glycol, 1,3-propanediol, or 1,4-butanediol), and the other glycol component are desirably removed by distillation or other means of evaporation as the polymerization reaction proceeds. The first glycol is desirably charged at a level 10 to 100 percent greater than the desired incorporation level in the final polymer. More preferably, the first glycol is charged at a level 20 to 70 percent greater than the desired incorporation level in the final polymer. The other glycol is desirably charged at a level 0 to 100 percent greater than the desired incorporation level in the final product, depending on the exact volatility of the other glycol.

The ranges given for the monomers are very wide because of the wide variation in the monomer loss during polymerization, depending on the efficiency of distillation columns and other kinds of recovery and recycle systems and the like, and are only an approximation. Exact amounts of monomers that are charged to a specific reactor to achieve a specific composition are readily determined by a skilled practitioner.

In the polymerization process, the monomers are combined, and heated gradually with mixing with a catalyst or catalyst mixture to a temperature in the range of 230° C. to about 300° C., desirably 250° C. to 295° C. The exact conditions and the catalysts depend on whether the diacids are polymerized as true acids or as dimethyl esters. The catalyst may be included initially with the reactants, and/or may be added one or more times to the mixture as it is heated. The catalyst used may be modified as the reaction proceeds. The heating and stirring are continued for a sufficient time and to a sufficient temperature, generally with removal by distillation of excess reactants, to yield a molten polymer having a high enough molecular weight to be suitable for making fabricated products.

Catalysts that may be used include salts of Li, Ca, Mg, Mn, Zn, Pb, Sb, Sn, Ge, and Ti, such as acetate salts and oxides, including glycol adducts, and Ti alkoxides. These are generally known in the art, and the specific catalyst or combination or sequence of catalysts used may be readily selected by a skilled practitioner. The preferred catalyst and preferred conditions differ depending on, for example, whether the diacid monomer is polymerized as the free diacid or as a dimethyl ester and the exact chemical identity of the glycol components.

The monomer composition selected for producing the sulfonated aliphatic-aromatic copolyetherester is chosen for specific uses and for specific sets of properties. As one skilled in the art will appreciate, the exact thermal properties observed will be a complex function of the exact chemical identity and level of each component utilized in the sulfonated aliphatic-aromatic copolyetherester.

Polymers can be made by the melt condensation process above having adequate inherent viscosity for many applications. Solid state polymerization may be used to achieve even higher inherent viscosities (molecular weights).

The product made by melt polymerization after extruding, cooling, and pelletizing may be essentially noncrystalline. Noncrystalline material can be made semicrystalline by heating it to a temperature above the glass transition temperature for an extended period of time. This induces crystallization so that the product can then be heated to a higher temperature to raise the molecular weight.

The polymer may also be crystallized prior to solid state polymerization by treatment with a relatively poor solvent for polyesters which induces crystallization. Such solvents reduce the glass transition temperature (Tg) allowing for crystallization. Solvent induced crystallization is known for polyesters and is described in U.S. Pat. Nos. 5,164,478 and 3,684,766.

The semicrystalline polymer is subjected to solid state polymerization by placing the pelletized or pulverized polymer into a stream of an inert gas, usually nitrogen, or under a vacuum of 1 Torr, at an elevated temperature, but below the melting temperature of the polymer for an extended period of time.

It is understood that the sulfonated aliphatic-aromatic copolyetheresters of the invention may be used with additives known within the art. Such additives may include thermal stabilizers, for example, phenolic antioxidants, secondary thermal stabilizers, for example, thioethers and phosphites, UV absorbers, for example benzophenoneand benzotriazolederivatives, UV stabilizers, for example, hindered amine light stabilizers (HALS), and the like. Said additives may further include plasticizers, processing aides, flow enhancing additives, lubricants, pigments, flame retardants, impact modifiers, nucleating agents to increase crystallinity, antiblocking agents such as silica, base buffers, such as sodium acetate, potassium acetate, and tetramethyl ammonium hydroxide (for example; as taught in U.S. Pat. Nos. 3,779,993, 4,340,519, 5,171,308, 5,171,309, and 5,219,646 and references cited therein), and the like. In addition, the sulfonated aliphatic-aromatic copolyetheresters of the invention may be filled with inorganic, organic and clay fillers, for example, wood flour, gypsum, wollastonite, montmorillonite minerals, chalk, kaolin, clay, silicon oxide, calcium terephthalate, aluminum oxide, titanium oxide, calcium phosphate, lithium fluoride, cellulose, starch, chemically modified starch, thermoplastic starch, calcium carbonate, calcium hydroxide, reinforcing agents, such as glass, and the like. The sulfonated aliphatic-aromatic copolyetheresters of the invention may also find use as a component of a polymer blend with other polymers, such as cellulose ethers, thermoplastic starch, poly(vinyl alcohol), polyolefins, ethylene copolymers, polyesters, aliphatic polyesters, poly(alkanoates), such as poly(lactide) and the like, aliphatic-aromatic copolyesters, other sulfonated aliphatic-aromatic copolyesters, and the like. The additives, fillers, or blend materials may be added before the polymerization process, at any stage during the polymerization process, or as a post polymerization process. This should not be considered limiting. Essentially any additive and filler of the art may find use in the sulfonated aliphatic-aromatic copolyetheresters of the invention.

When an inorganic filler is included, the inorganic filler may be added to the polymer of the invention at any stage during the polymerization of the polymer or after the polymerization is completed. For example, the inorganic filler may be added with the sulfonated aliphatic-aromatic copolyetherester monomers at the start of the polymerization process. This is preferable for, for example, the silica and titanium dioxide fillers, to provide adequate dispersion of the inorganic fillers within the polyester matrix. Alternatively, the inorganic filler may be added at an intermediate stage of the polymerization, for example, as the precondensate passes into the polymerization vessel. As yet a further alternative, the inorganic filler may be added after the sulfonated aliphatic-aromatic copolyetherester exits the polymerizer. For example, the sulfonated aliphatic-aromatic copolyetherester may be melt fed to any intensive mixing operation, such as a static mixer or a single- or twin-screw extruder and compounded with the inorganic filler.

As yet a further method to produce the sulfonated aliphatic-aromatic copolyetherester filled compositions of the invention, the sulfonated aliphatic-aromatic copolyetherester may be combined with the inorganic filler in a subsequent postpolymerization process. Typically, such a process would involve intensive mixing of the molten sulfonated aliphatic-aromatic copolyetherester with the inorganic filler. Said intensive mixing may be provided through static mixers, Brabender mixers, single screw extruders, twin screw extruders, and the like. In a typical process, the sulfonated aliphatic-aromatic copolyetherester would be dried. The dried sulfonated aliphatic-aromatic copolyetherester may then be mixed with the inorganic filler. Alternatively, the sulfonated aliphatic-aromatic copolyetherester and the inorganic filler may be cofed through two different feeders. In an extrusion process, the sulfonated aliphatic-aromatic copolyetherester and the inorganic filler would typically be fed into the back, feed section of the extruder. However, this should not be considered limiting. The sulfonated aliphatic-aromatic copolyetherester and the inorganic filler may be advantageously fed into two different locations of the extruder. For example, the sulfonated aliphatic-aromatic copolyetherester may be added in the back, feed section of the extruder while the inorganic filler is fed ("side-stuffed") in the front of the extruder near the die plate. The extruder temperature profile is set up to allow the sulfonated aliphatic-aromatic copolyetherester to melt under the processing conditions. The screw design will also provide stress and, in turn, heat, to the resin as it mixes the molten sulfonated aliphatic-aromatic copolyetherester with the inorganic filler.

The clay filler may be added to the polymer of the invention at any stage during the polymerization of the polymer or after the polymerization is completed. For example, the clay fillers may be added with the sulfonated aliphatic-aromatic copolyetherester monomers at the start of the polymerization process. Alternatively, the clay filler may be added at an intermediate stage of the polymerization, for examples, as the precondensate passes into the polymerization vessel. As yet a further alternative, the clay filler may be added after the sulfonated aliphatic-aromatic copolyetherester exits the polymerizer. For example, the sulfonated aliphatic-aromatic copolyetherester may be melt fed to a static mixer or to an extruder and compounded with the clay filler.

As yet a further method to produce the sulfonated aliphatic-aromatic copolyetherester filled compositions of the invention, the sulfonated aliphatic-aromatic copolyetherester may be combined with the clay filler in a subsequent postpolymerization process. Typically, such a process would involve intensive mixing of the molten sulfonated aliphatic-aromatic copolyetherester with the inorganic filler. Said intensive mixing may be provided through static mixers, Brabender mixers, single screw extruders, twin screw extruders, and the like. In a typical process, the sulfonated aliphatic-aromatic copolyetherester would be dried. The dried sulfonated aliphatic-aromatic copolyetherester may then be mixed with the clay filler. Alternatively, the sulfonated aliphatic-aromatic copolyetherester and the clay filler may be cofed through two different feeders. In an extrusion process, the sulfonated aliphatic-aromatic copolyetherester and the clay filler would typically be fed into the back, feed section of the extruder. However, this should not be considered limiting. The sulfonated aliphatic-aromatic copolyetherester and the clay filler may be advantageously fed into two different locations of the extruder. For example, the sulfonated aliphatic-aromatic copolyetherester may be added in the back, feed section of the extruder while the clay filler is fed ("side-stuffed") in the front of the extruder near the die plate. The extruder temperature profile is set up to allow the sulfonated aliphatic-aromatic copolyetherester to melt under the processing conditions. The screw design will also provide stress and, in turn, heat, to the resin as it mixes the molten sulfonated aliphatic-aromatic copolyetherester with the clay filler.

As a further aspect of the invention, the sulfonated aliphatic-aromatic copolyetheresters of the invention have been found to be useful within a wide variety of shaped articles. The shaped articles produced from the sulfonated aliphatic-aromatic copolyetheresters of the invention have advantageous thermal properties. The shaped articles of the invention include film, sheets, fiber, melt blown containers, molded parts, such as cutlery, foamed parts, polymeric melt extrusion coatings onto substrates, polymeric solution coatings onto substrates and the like. The sulfonated aliphatic-aromatic copolyetheresters of the invention may be solution or melt processed to form coatings, films, and the like. Coatings may be produced by coating a substrate with polymer solutions of the sulfonated aliphatic-aromatic copolyetheresters of the invention followed by drying, by coextruding the sulfonated aliphatic-aromatic copolyetheresters of the invention with other materials, or by melt coating a preformed substrate with the polyesters of the invention. This should not be considered limiting. The sulfonated aliphatic-aromatic copolyetheresters of the invention will find utility in essentially any process known within the art. Said coatings derived from the sulfonated aliphatic-aromatic copolyetheresters of the invention will find utility as barriers to moisture, oxygen, carbon dioxide, and the like. Said coatings derived from the sulfonated aliphatic-aromatic copolyetheresters of the invention will also be useful as adhesives. Films of the sulfonated aliphatic-aromatic copolyetheresters of the invention may be produced by any known art method, including, for example, solution or melt casting.

Polymeric films have a variety of uses, such as in packaging, especially of foodstuffs, adhesives tapes, insulators, capacitors, photographic development, x-ray development, and as laminates, for example. For many of these uses, the heat resistance of the film is an important factor. Therefore, a higher melting point and glass transition temperature are desirable to provide better heat resistance and more stable electrical characteristics, along with a rapid biodegradation rate. Further, it is desired that these films have good tensile strength and a high elongation at break.

The sulfonated aliphatic-aromatic copolyetheresters of the invention may be formed into a film for use in any one of the many different applications, such as food packaging, labels, dielectric insulation, a water vapor barrier, or the like. The monomer composition used to form the sulfonated aliphatic-aromatic copolyetherester is preferably chosen to result in a partially crystalline polymer desirable for the formation of film, wherein the crystallinity provides strength and elasticity. As first produced, the polyester is generally semi-crystalline in structure. The crystallinity increases on reheating and/or stretching of the polymer, as occurs in the production of film.

In the process of the invention, film is made from the copolyetherester by any process known in the art. The difference between a film and a sheet is the thickness, but there is no set industry standard as to when a film becomes a sheet. For purposes of this invention, a film is less than or equal to 0.25 mm (10 mils) thick, preferably between about 0.025 mm and 0.15 mm (1 mil and 6 mils). However, thicker films can be formed up to a thickness of about 0.50 mm (20 mils).

The film of the invention is preferably formed by either solution casting or extrusion. Extrusion is particularly preferred for formation of "endless" products, such as films and sheets, which emerge as a continuous length. In extrusion, the polymeric material, whether provided as a molten polymer or as plastic pellets or granules, is fluidized and homogenized. This mixture is then forced through a suitably shaped die to produce the desired cross-sectional film shape. The extruding force may be exerted by a piston or ram (ram extrusion), or by a rotating screw (screw extrusion), which operates within a cylinder in which the material is heated and plasticized and from which it is then extruded through the die in a continuous flow. Single screw, twin screw, and multi-screw extruders may be used as known in the art. Different kinds of die are used to produce different products, such as blown film (formed by a blow head for blown extrusions), sheets and strips (slot dies) and hollow and solid sections (circular dies). In this manner, films of different widths and thickness may be produced, and, in some cases, such as when film is used as a coating, it may be extruded directly onto the object to be coated. For example, wires and cables can be sheathed directly with polymeric films extruded from oblique heads. As a further example, laminated paper coatings can be produced by melt extruding the polymer directly onto paperboard. After extrusion, the polymeric film is taken up on rollers, cooled, and taken off by means of suitable devices which are designed to prevent any subsequent deformation of the film.

Using extruders as known in the art, film can be produced by extruding a thin layer of polymer over chilled rolls and then further drawing down the film to size by tension rolls. Preferably, the finished film is less than or equal to 0.25 mm thick. Blown film, which is generally stronger, tougher, and made more rapidly than cast film, is made by extruding a tube. In producing blown film, the melt flow is turned upward from the extruder and fed through an annular die. As this tube leaves the die, internal pressure is introduced through the die mandrel with air, which expands the tube from about 1.5 to about 2.5 times the die diameter and simultaneously draws the film, causing a reduction in thickness. The resulting sleeve is subsequently slit along one side, making a larger film width than could be conveniently made via the cast film method. In extrusion coating, the substrate (paper, foil, fabric, polymeric film, and the like) is compressed together with the extruded polymeric melt by means of pressure rolls so that the polymer impregnates the substrate for maximum adhesion.

For manufacturing large quantities of film, a sheeting calender is employed. The rough film is fed into the gap of the calender, a machine comprising a number of heatable parallel cylindrical rollers which rotate in opposite directions and spread out the polymer and stretch it to the required thickness. The last roller smoothes the film thus produced. If the film is required to have a textured surface, the final roller is provided with an appropriate embossing pattern. Alternatively, the film may be reheated and then passed through an embossing calender. The calender is followed by one or more cooling drums. Finally, the finished film is reeled up.

Alternatively, as mentioned previously, a supporting material may be coated directly with a film. For example, textile fabrics, paper, cardboard, metals, various building materials and the like, may be coated directly with the polyester polymer for the purpose of electrical insulation, protection against corrosion, protection against the action of moisture or chemicals, impermeability to gases and liquids, or increasing the mechanical strength. One process to achieve this is referred to as melt extrusion of the polymeric melt onto a substrate. Coatings are applied to textiles, foil, and other sheet materials by continuously operating spread-coating machines. A coating knife, such as a "doctor knife", ensures uniform spreading of the coating materials (in the form of solution, emulsions, or dispersions in water or an organic medium) on the supporting material, which is moved along by rollers. The coating is then dried. Alternatively, when the coating is applied to the supporting material in the form of a polymeric film, the process is called laminating.

Metal articles of complex shapes can also be coated with the polymeric film by means of the whirl sintering process. The articles, heated to above the melting point of the polymer, are introduced into a fluidized bed of powdered polymer wherein the polymer particles are held in suspension by a rising stream of air, thus depositing a coating on the metal by sintering.

Extruded films may also be used as the starting material for other products. For example, the film may be cut into small segments for use as feed material for other processing methods, such as injection molding.

The extrusion process can be combined with a variety of postextruding operations for expanded versatility. Such postforming operations include altering round to oval shapes, blowing the film to different dimensions, machining and punching, biaxial stretching, and the like, as known to those skilled in the art.

The polymeric film of the invention may be combined with other polymeric materials during extrusion and/or finishing to form laminates or multilayer films with improved characteristics, such as water vapor resistance. In particular, the polymeric film of the invention may be combined with one or more of the following: poly(ethylene terephthalate) (PET), polyaramid, polyethylene sulfide (PES), polyphenylene sulfide (PPS), polyimide (PI), polyethylene imine (PEI), poly(ethylene naphthalate) (PEN), polysulfone (PS), polyether ether ketone (PEEK), polyolefins, polyethylene, poly(cyclic olefins), cellulose, and cyclohexylene dimethylene terephthalate, for example. Other polymers may also find utility within the invention. A multilayer or laminate film may be made by any method known in the art, and may have as many as five or more separate layers joined together by heat, adhesive, and/or tie layer, as known in the art.

A film may also be made by solution casting, which produces more consistently uniform gauge film than that made by melt extrusion. Solution casting comprises dissolving polymeric granules, powder, or the like in a suitable solvent with any desired formulant, such as a plasticizer or colorant. The solution is filtered to remove dirt or large particles and cast from a slot die onto a moving belt, preferably of stainless steel, dried, whereon the film cools. The extrudate thickness is five to ten times that of the finished film. The film may then be finished in a like manner to the extruded film.

One of ordinary skill in the art will be able to identify appropriate process parameters based on the sulfonated aliphatic-aromatic copolyetherester composition and process used for film formation.

Regardless of how the film is formed, it is desirably subjected to biaxial orientation by stretching in both the machine and transverse direction after formation. The machine direction stretch is initiated in forming the film simply by rolling out and taking up the film. This inherently stretches the film in the direction of takeup, orienting some of the fibers. Although this strengthens the film in the machine direction, it allows the film to tear easily in the direction at right angles because all of the fibers are oriented in one direction.

Therefore, biaxially stretched films are preferred. Biaxial stretching orients the fibers parallel to the plane of the film, but leaves the fibers randomly oriented within the plane of the film. This provides superior tensile strength, flexibility, toughness and shrinkability, for example, in comparison to non-oriented films. It is desirable to stretch the film along two axes at right angles to each other. This increases tensile strength and elastic modulus in the directions of stretch. It is most desirable for the amount of stretch in each direction to be roughly equivalent, thereby providing similar properties or behavior within the film when tested from any direction. However, certain applications, such as those desiring a certain amount of shrinkage or greater strength in one direction over another, as in labels or adhesive and magnetic tapes, will require uneven, or uniaxial, orientation of the fibers of the film.

The biaxial orientation may be obtained by any process known in the art. However, tentering is preferred, wherein the material is stretched while heating in the transverse direction simultaneously with, or subsequent to, stretching in the machine direction.

Shrinkage can be controlled by holding the film in a stretched position and heating for a few seconds before quenching. This heat stabilizes the oriented film, which then may be forced to shrink only at temperatures above the heat stabilization temperature.

The above process conditions and parameters for film making by any method in the art are easily determined by a skilled artisan for any given polymeric composition and desired application.

The properties exhibited by a film will depend on several factors indicated above, including the polymeric composition, the method of forming the polymer, the method of forming the film, and whether the film was treated for stretch or biaxially oriented. These factors affect many properties of the film, such as shrinkage, tensile strength, elongation at break, impact strength, dielectric strength and constant, tensile modulus, chemical resistance, melting point, heat deflection temperature, and the like.

The film properties may be further adjusted by adding certain additives and fillers to the sulfonated aliphatic-aromatic copolyetherester, such as colorants, dyes, UV and thermal stabilizers, antioxidants, plasticizers, lubricants antiblock agents, slip agents, and the like, as recited above. Alternatively, the sulfonated aliphatic-aromatic copolyetheresters of the invention may be blended with one or more other polymers, such as starch, to improve certain characteristics.

Polymeric sheets have a variety of uses, such as in signage, glazings, thermoforming articles, displays, and display substrates, for example. For many of these uses, the heat resistance of the sheet is an important factor. Therefore, a higher melting point and glass transition temperature are desirable to provide better heat resistance and greater stability. Further, it is desired that these sheets have ultraviolet (UV) and scratch resistance, good tensile strength, high optical clarity, and a good impact strength, particularly at low temperatures.

Various polymeric compositions have been used in an attempt to meet all of the above criteria. In particular, poly (ethylene terephthalate) (PET) has been used to form low-cost sheets for many years. However, these PET sheets have poor low temperature impact strength, a low glass transition temperature (Tg), and a high rate of crystallization. Thus, PET sheets cannot be used at low temperatures because of the danger of breakage and they cannot be used at high temperatures because the polymer crystallizes, thereby diminishing optical clarity.

Polycarbonate sheets can be used in applications where a low temperature impact strength is needed, or a high service temperature is required, In this regard, polycarbonate sheets have high impact strengths at low temperatures as well as a high Tg which allows them to be used in high temperature applications. However, polycarbonate has poor solvent resistance, thereby limiting its use in certain applications, and is prone to stress induced cracking. Polycarbonate sheets also provide a greater impact strength than is needed for certain applications, making them costly and inefficient for use.

The sulfonated aliphatic-aromatic copolyetheresters of the invention may be formed by one of the above methods, or by any other method known in the art, and may be formed into sheets directly from the polymerization melt. In the alternative, the sulfonated aliphatic-aromatic copolyetherester may be formed into an easily handled shape (such as pellets) from the melt, which may then be used to form a sheet. The sheet of the invention can be used for forming signs, glazings (such as in bus stop shelters, sky lights or recreational vehicles), displays, automobile lights, and in thermoforming articles, for example.

In the process of the invention, sheet is made from the copolyetherester by any process known in the art. The difference between a sheet and a film is the thickness, but there is no set industry standard as to when a film becomes a sheet. For purposes of this invention, a sheet is greater than about 0.25 mm (10 mils) thick, preferably between about 0.25 mm and 25 mm, more preferably from about 2 mm to about 15 mm, and even more preferably from about 3 mm to about 10 mm. In a preferred embodiment, the sheets of the invention have a thickness sufficient to cause the sheet to be rigid, which generally occurs at about 0.50 mm and greater, However, sheets greater than 25 mm, and thinner than 0.25 mm may be formed.

Sheets may be formed by any process known in the art, such as extrusion, solution casting, or injection molding. The parameters for each of these processes can be easily determined by one of ordinary skill in the art depending upon viscosity characteristics of the sulfonated aliphatic-aromatic copolyetherester and the desired thickness of the sheet.

The sheet of the invention is preferably formed by either solution casting or extrusion. Extrusion is particularly preferred for formation of "endless" products, such as films and sheets, which emerge as a continuous length. For example, see International Publications WO 96/38282 and WO 97/00284, which describe the formation of crystallizable sheets by melt extrusion.

In extrusion, the polymeric material, whether provided as a molten polymer or as plastic pellets or granules, is fluidized and homogenized. This mixture is then forced through a suitably shaped die to produce the desired cross-sectional sheet shape. The extruding force may be exerted by a piston or ram (ram extrusion), or by a rotating screw (screw extrusion), which operates within a cylinder in which the material is heated and plasticized and from which it is then extruded through the die in a continuous flow. Single screw, twin screw, and multi-screw extruders may be used as known in the art. Different kinds of die are used to produce different products, such as sheets and strips (slot dies) and hollow and solid sections (circular dies). In this manner, sheets of different widths and thickness may be produced. After extrusion, the polymeric sheet is taken up on rollers, cooled, and taken off by means of suitable devices which are designed to prevent any subsequent deformation of the sheet.

Using extruders as known in the art, a sheet can be produced by extruding a thin layer of polymer over chilled rolls and then further drawing down the sheet to size (>0.25 mm) by tension rolls. Preferably, the finished sheet is greater than 0.25 mm thick.

For manufacturing large quantities of sheets, a sheeting calender is employed. The rough film is fed into the gap of the calender, a machine comprising a number of heatable parallel cylindrical rollers which rotate in opposite directions and spread out the polymer and stretch it to the required thickness. The last roller smoothes the sheet thus produced. If the sheet is required to have a textured surface, the final roller is provided with an appropriate embossing pattern. Alternatively, the sheet may be reheated and then passed through an embossing calender. The calender is followed by one or more cooling drums. Finally, the finished sheet is reeled up.

The above extrusion process can be combined with a variety of post-extruding operations for expanded versatility. Such post-forming operations include altering round to oval shapes, stretching the sheet to different dimensions, machining and punching, biaxial stretching and the like, as known to those skilled in the art.

The polymeric sheet of the invention may be combined with other polymeric materials during extrusion and/or finishing to form laminates or multilayer sheets with improved characteristics, such as water vapor resistance. In particular, the polymeric sheet of the invention may be combined with one or more of the following: poly(ethylene terephthalate) (PET), polyaramid, polyethylene sulfide (PES), polyphenylene sulfide (PPS), polyimide (PI), polyethylene imine (PEI), poly(ethylene naphthalate) (PEN), polysulfone (PS), polyether ether ketone (PEEK), polyolefins, polyethylene, poly(cyclic olefins), cellulose, and cyclohexylene dimethylene terephthalate, for example. Other polymers may also find utility within the invention. A multilayer or laminate sheet may be made by any method known in the art, and may have as many as five or more separate layers joined together by heat, adhesive, and/or tie layer, as known in the art.

A sheet may also be made by solution casting, which produces more consistently uniform gauge sheet than that made by melt extrusion. Solution casting comprises dissolving polymeric granules, powder or the like in a suitable solvent with any desired formulant, such as a plasticizer or colorant. The solution is filtered to remove dirt or large particles and cast from a slot die onto a moving belt, preferably of stainless steel, dried, whereon the sheet cools. The extrudate thickness is five to ten times that of the finished sheet. The sheet may then be finished in a like manner to the extruded sheet.

Further, sheets and sheet-like articles, such as discs, may be formed by injection molding by any method known in the art.

One of ordinary skill in the art will be able to identify appropriate process parameters based on the polymeric composition and process used for sheet formation.

Regardless of how the sheet is formed, it is desirably subjected to biaxial orientation by stretching in both the machine and transverse direction after formation. The machine direction stretch is initiated in forming the sheet simply by rolling out and taking up the sheet. This inherently stretches the sheet in the direction of takeup, orienting some of the fibers. Although this strengthens the sheet in the machine direction, it allows the sheet to tear easily in the direction at right angles because all of the fibers are oriented in one direction.

Therefore, biaxially stretched sheets are preferred for certain uses where uniform sheeting is desired. Biaxial stretching orients the fibers parallel to the plane of the sheet, but leaves the fibers randomly oriented within the plane of the sheet. This provides superior tensile strength, flexibility, toughness and shrinkability, for example, in comparison to non-oriented sheets. It is desirable to stretch the sheet along two axes at right angles to each other. This increases tensile strength and elastic modulus in the directions of stretch. It is most desirable for the amount of stretch in each direction to be roughly equivalent, thereby providing similar properties or behavior within the sheet when tested from any direction.

The biaxial orientation may be obtained by any process known in the art. However, tentering is preferred, wherein the material is stretched while heating in the transverse direction simultaneously with, or subsequent to, stretching in the machine direction.

Shrinkage can be controlled by holding the sheet in a stretched position and heating for a few seconds before quenching. This heat stabilizes the oriented sheet, which then may be forced to shrink only at temperatures above the heat stabilization temperature.

The above process conditions and parameters for sheet making by any method in the art are easily determined by a skilled artisan for any given polymeric composition and desired application.

The properties exhibited by a sheet will depend on several factors indicated above, including the polymeric composition, the method of forming the polymer, the method of forming the sheet, and whether the sheet was treated for stretch or biaxially oriented. These factors affect many properties of the sheet, such as shrinkage, tensile strength, elongation at break, impact strength, dielectric strength and constant, tensile modulus, chemical resistance, melting point, heat deflection temperature, and the like.

The sheet properties may be further adjusted by adding certain additives and fillers to the polymeric composition, such as colorants, dyes, UV and thermal stabilizers, antioxidants, plasticizers, lubricants antiblock agents, slip agents, and the like, as recited above. Alternatively, the sulfonated aliphatic-aromatic copolyetheresters of the invention may be blended with one or more other polymers, such as starch, to improve certain characteristics. Other polymers may be added to change such characteristics as air permeability, optical clarity, strength and/or elasticity, for example.

The sheets of the invention as described above may be thermoformed by any known method into any desirable shape, such as covers, skylights, shaped greenhouse glazings, displays, food trays, and the like. The thermoforming is accomplished by heating the sheet to a sufficient temperature and for sufficient time to soften the sulfonated aliphatic-aromatic copolyetherester so that the sheet can be easily molded into the desired shape. In this regard, one of ordinary skill in the art can easily determine the optimal thermoforming parameters depending upon the viscosity and crystallization characteristics of the polyester sheet.

The sulfonated aliphatic-aromatic copolyetheresters of the invention may also find utility as plastic containers. Plastic containers are widely used for foods and beverages, and also for non-food materials. Poly(ethylene terephthalate) (PET) is used to make many of these containers because of its appearance (optical clarity), ease of blow molding, chemical and thermal stability, and its price. PET is generally fabricated into bottles by blow molding processes, and generally by stretch blow molding.

In stretch blow molding, PET is first shaped by injection molding into a thick-walled preformed parison (a "preform"), which typically is in the shape of a tube with a threaded opening at the top. The parison may be cooled and then used later in a subsequent step, or the process may be carried out in one machine with cooling just to the stretch blow molding temperature. In the stretch blow molding step, the parison is heated to a high enough temperature in a mold to allow shaping, but not so hot that it crystallizes or melts (i.e., just above the glass transition temperature Tg). The parison is expanded to fill the mold by rapidly stretching it mechanically in the axial direction (e.g., by using a mandrel) while simultaneously forcing air under pressure into the heated parison to expand it radially. PET is typically modified for blow molding with a small amount of comonomer, usually 1,4-cyclohexanedimethanol or isophthalic acid, which increases the width of the temperature window for successful blow molding to about 9° C. The comonomer is necessary because of the need to have a wider temperature window, and also to decrease the rate of stress induced crystallization. At the same time, the comonomer may have the undesirable effect of lowering the glass transition temperature and reducing the crystallinity of PET. Stretch blow molding of PET, and blow molding processes in general, are well known in the art. Reviews are widely available, as for example, "Blow Molding" by C. Irwin in Encyclopedia of Polymer Science And Engineering, Second Edition, Vol. 2, John Wiley and Sons, New York, 1985, pp. 447-478.

The containers described herein may be made by any method known in the art, such as extrusion, injection molding, injection blow molding, rotational molding, thermoforming of a sheet, and stretch-blow molding.

In the invention, the preferred method for molding a container is stretch-blow molding, which is generally used in the production of poly(ethylene terephthalate) (PET) containers, such as bottles. In this case, use may be made of any of the cold parison methods, in which a preformed parison (generally made by injection molding) is taken out of the mold and then subjected to stretch blow molding in a separate step. The hot parison method as known in the art may also be used, wherein the hot parison is immediately subjected to stretch blow molding in the same equipment without complete cooling after injection molding to make the parison. The parison temperature will vary based on the exact composition of the polymer to be used. Generally, parison temperatures in the range from about 90° C. to about 160° C. are found useful. The stretch blow molding temperature will also vary dependent on the exact material composition used, but a mold temperature of about 80° C. to about 150° C. is generally found to be useful.

Containers of the invention may have any shape desirable, and particularly include narrow-mouth bottles and wide-mouth bottles having threaded tops and a volume of about 400 mL to about 3 liters, although smaller and larger containers may be formed.

The containers can be used in standard cold fill applications. For some of the sulfonated aliphatic-aromatic copolyetheresters and filled compositions of the invention, hot fill applications may also be used.

The containers of the invention are suitable for foods and beverages, and other solids and liquids. The containers are normally clear and transparent, but can be modified to have color or to be opaque, rather than transparent, if desired, by adding colorants or dyes, or by causing crystallization of the polymer, which results in opaqueness.

The sulfonated aliphatic-aromatic copolyetheresters of the invention may further find utility in the form of fibers. Polyester fibers are produced in large quantities for use in a variety of applications. In particular, these fibers are desirable for use in textiles, particularly in combination with natural fibers such as cotton and wool. Clothing, rugs, and other items may be fashioned from these fibers. Further, polyester fibers are desirable for use in industrial applications due to their elasticity and strength. In particular, they are used to make articles such as tire cords and ropes.

The term "fibers" as used herein is meant to include continuous monofilaments, non-twisted or entangled multifilament yarns, staple yarns, spun yarns, and non-woven materials. Such fibers may be used to form uneven fabrics, knitted fabrics, fabric webs, or any other fiber-containing structures, such as tire cords.

Synthetic fibers, such as nylon, acrylic, polyesters, and others, are made by spinning and drawing the polymer into a filament, which is then formed into a yarn by winding many filaments together. These fibers are often treated mechanically and/or chemically to impart desirable characteristics such as strength, elasticity, heat resistance, hand (feel of fabric), and the like as known in the art based on the desired end product to be fashioned from fibers.

The monomer composition of the sulfonated aliphatic-aromatic copolyetherester of the invention is desirably chosen to result in a partially crystalline polymer. The crystallinity is desirable for the formation of fibers, providing strength and elasticity. As first produced, the polyester is mostly amorphous in structure. In preferred embodiments, the polyester polymer readily crystallizes on reheating and/or extension of the polymer.

In the process of the invention, fibers are made from the polymer by any process known in the art. Generally, however, melt spinning is preferred for polyester fibers.

Melt spinning, which is most commonly used for polyesters such as poly(ethylene terephthalate), comprises heating the polymer to form a molten liquid, or melting the polymer against a heated surface. The molten polymer is forced through a spinneret with a plurality of fine holes. Upon contact with air or a non-reactive gas stream after passing through the spinneret, the polymer solution from each spinneret solidifies into filaments. The filaments are gathered together downstream from the spinneret by a convergence guide, and may be taken up by a roller or a plurality of rollers. This process allows filaments of various sizes and cross sections to be formed, including filaments having a round, elliptical, square, rectangular, lobed, or dog-boned cross section, for example.

Following the extrusion and uptake of the fiber, the fiber is usually drawn, thereby increasing the crystallization and maximizing desirable properties such as orientation along the longitudinal axis, which increases elasticity and strength. The drawing may be done in combination with takeup by using a series of rollers, some of which are generally heated, as known in the art, or may be done as a separate stage in the process of fiber formation.

The polymer may be spun at speeds of from about 600 to 6000 meters per minute or higher, depending on the desired fiber size. For textile applications, a fiber with a denier per filament of from about 0.1 to about 100 is desired. Preferably, the denier is about 0.5 to 20, more preferably 0.7 to 10. However, for industrial applications the fiber should be from about 0.5 to 100 denier per filament, preferably about 1.0 to 10.0, most preferably 3.0 to 5.0 denier per filament. The required size and strength of a fiber can readily be determined by one of ordinary skill in the art for any given application.

The resulting filamentary material is amenable to further processing through the use of additional processing equipment, or it may be used directly in applications requiring a continuous filament textile yarn. If desired, the filamentary material subsequently may be converted from a flat yarn to a textured yarn through known false twist testuring conditions or other processes known in the art. In particular, it is desirable to increase the surface area of the fiber to provide a softer feel and to enhance the ability of the fibers to breathe, thereby providing better insulation and water retention in the case of textiles, for example. The fibers may therefore be crimped or twisted by the false twist method, air jet, edge crimp, gear crimp, or stuffer box, for example. Alternatively, the fibers may be cut into shorter lengths, called staple, which may be processed into yarn. A skilled artisan can determine the best method of crimping or twisting based on the desired application and the composition of the fiber.

After formation, the fibers are finished by any method appropriate to the desired final use. In the case of textiles, this may include dyeing, sizing, or addition of chemical agents such as antistatic agents, flame retardants, UV light stabilizers, antioxidants, pigments, dyes, stain resistants, antimicrobial agents and the like, which are appropriate to adjust the look and hand of the fibers. For industrial applications, the fibers may be treated to impart additional desired characteristics such as strength, elasticity, or shrinkage, for example.

The continuous filament fiber of the invention may be used either as produced or texturized for use in a variety of applications such as textile fabrics for apparel and home furnishings, for example. High tenacity fiber can be used in industrial applications such as high strength fabrics, tarpaulins, sail cloth, sewing threads, and rubber reinforcement for tires and V-belts, for example.

The staple fiber of the invention may be used to form a blend with natural fibers, especially cotton and wool. In particular, the polyester is a chemically resistant fiber which is generally resistant to mold, mildew, and other problems inherent to natural fibers. The polyester fiber further provides strength and abrasion resistance and lowers the cost of material. Therefore, it is ideal for use in textiles and other commercial applications, such as for use in fabrics for apparel, home furnishings, and carpets.

Further, the copolyetherester of the invention may be used with a synthetic or natural polymer to form heterogeneous fiber, thereby providing a fiber with improved properties. The heterogeneous fiber may be formed in any suitable manner, such as side-by-side, sheath-core, and matrix designs, as is known within the art.

The sulfonated aliphatic-aromatic copolyetheresters of the invention will also find utility when formed into shaped foamed articles. Thermoplastic polymeric materials are foamed to provide low density articles, such as films, cups, food trays, decorative ribbons, furniture parts, and the like. For example, polystyrene beads containing low boiling hydrocarbons, such as pentane, are formed into light weight foamed cups for hot drinks such as coffee, tea, hot chocolate, and the like. Polypropylene can be extruded in the presence of blowing agents such as nitrogen or carbon dioxide gas to provide decorative films and ribbons for package wrappings. Also, polypropylene can be injection molded in the presence of blowing agents to form lightweight furniture parts such as table legs and to form lightweight chairs.

Polyesters, such as poly(ethylene terephthalate), typically have a much higher density (e.g., 1.3 g/cc), than other polymers. It would, therefore, be desirable to be able to foam polyester materials to decrease the weight of molded parts, films, sheets, food trays, thermoformed parts, and the like. Such foamed articles also provide improved insulating properties than unfoamed articles.

It has been generally been found in the art that the polyester to be foamed should desirably have a high melt viscosity. This is desired in order to have sufficient melt viscosity to hold the as formed foamed shape sufficiently long for the polyester to solidify to form the final foamed article. This can be achieved by raising the as produced polyester inherent viscosity through post-polymerization processes, such as the solid state polymerization method. Alternatively, the polyester may incorporate a branching agent, such as described in U.S. Pat. Nos. 4,132,707, 4,145,466, 4,999,388, 5,000,991, 5,110,844, 5,128,383, and 5,134,028. Such branched polyesters may additionally be subjected to the solid state polymerization, as described above, to further enhance the melt viscosity. It has also been found that the incorporation of sulfonate substituents onto the polyester backbone raises the apparent melt viscosity of the polyester, providing an adequate foamable polyester. More recently, it has been suggested that such sulfonated polyesters may be reacted with divalent cations to enhance the melt viscosity even greater, allowing for more desirable foamable polyesters (see, for example, U.S. Pat. No. 5,922,782).

The copolyetheresters of the invention may be readily foamed by a wide variety of methods. These include the injection of an inert gas such as nitrogen or carbon dioxide into the melt during extrusion or molding operations. Alternatively, inert hydrocarbon gases such as methane, ethane, propane, butane, and pentane, or chlorofluorocarbons, hydrochlorofluorocarbons, hydrofluorocarbons, and the like may be used. Another method involves the dry blending of chemical blowing agents with the polyester and then extruding or molding the compositions to provide foamed articles. During the extrusion or molding operation, an inert gas such as nitrogen is released from the blowing agents and provides the foaming action. Typical blowing agents include azodicaronamide, hydrazocarbonamide, dinitrosopentamethylenetetramine, p-toluenesulfonyl hydrazodicarboxylate, 5-phenyl-3,6-dihydro-1,3,4-oxadiazin-2-one, sodium borohydride, sodium bicarbonate, 5-phenyltetrazole, p,p'-oxybis(benzenesulfonylhydrazide), and the like. Still another method involves the blending of sodium carbonate or sodium bicarbonate with one portion of the polyester pellets, blending of an organic acid, such as citric acid, with another portion of the polyester pellets and then blending of the two types of pellets through extrusion or molding at elevated temperatures. Carbon dioxide gas is released from the interaction of the sodium carbonate and citric acid to provide the desired foaming action in the polymeric melt.

It is desirable that the foamable polyester compositions incorporate nucleation agents to create sites for bubble initiation, influence the cell size of the foamed sheet or object, and to hasten the solidification of the as foamed article. Examples of said nucleation agents may include sodium acetate, talc, titanium dioxide, polyolefin materials such as polyethylene, polypropylene, and the like.

Polymeric foaming equipment and processes are generally known within the art. See, for example, U.S. Pat. Nos. 5,116,881, 5,134,028, 4,626,183, 5,128,383, 4,746,478, 5,110,844, 5,000,844, and 4,761,256.

Additional reviews on foaming technology may be found in Kirk-Othmer Encyclopedia of Chemical Technology, Third Edition, Volume 11, pp. 82-145 (1980), John Wiley and Sons, Inc., New York, N.Y. and the Encyclopedia of Polymer Science and Engineering, Second Edition, Volume 2, pp. 434-446 (1985), John Wiley and Sons, Inc., New York, N.Y. These references are herein incorporated by reference.

As described above, the foamable polyester compositions may include a wide variety of additives, fillers, or be blended with other materials. For biodegradable foams, the addition of cellulose, cellulose derivatives, such as chemically modified cellulose, starch, and starch derivatives, such as chemically modified starch and thermoplastic starch, is especially preferred.

EXAMPLES AND COMPARATIVE EXAMPLES

Test Methods

Differential Scanning Calorimetry (DSC) was performed on a TA Instruments Model Number 2920 machine. Samples were heated under a nitrogen atmosphere at a rate of 20° C./minute to 300° C., programmed cooled back to room temperature at a rate of 20° C./minute, and then reheated to 300° C. at a rate of 20° C./minute. The observed sample glass transition temperature (Tg) and crystalline melting temperature (Tm) noted below were from the second heat.

Inherent Viscosity (IV) was as defined in "Preparative Methods of Polymer Chemistry", W. R. Sorenson and T. W. Campbell, 1961, p. 35. The IV was determined at a concentration of 0.5 g./100 mL of a 50:50 weight percent trifluoroacetic acid:dichloromethane acid solvent system at room temperature by a Goodyear R-103B method.

Laboratory Relative Viscosity (LRV) was the ratio of the viscosity of a solution of 0.6 gram of the polyester sample dissolved in 10 mL of hexafluoroisopropanol (HFIP) containing 80 ppm sulfuric acid to the viscosity of the sulfuric acid-containing hexafluoroisopropanol itself, both measured at 25° C. in a capillary viscometer. The LRV may be numerically related to IV. Where this relationship is utilized, the term "calculated IV" is noted.

Biodegradation was performed according to the ISO 14855 method: "Determination of the ultimate aerobic biodegradability and disintegration of plastic materials under controlled composting conditions—Method by analysis of evolved carbon". This test involved injecting an inoculum consisting of a stabilized and mature compost derived from the organic fraction of municipal solid waste with ground powder of the polymer to be tested on a vermiculite matrix, composting under standard conditions at an incubation temperature controlled at 58° C.+/−2° C. The test was conducted with one polymer sample. The carbon dioxide evolved was used to determine the extent of biodegradation.

Comparative Example 1

To a 1.0 liter glass flask was added bis(2-hydroxyethyl) terephthalate (508.48 grams), dimethyl glutarate (83.00 grams), dimethyl 5-sulfoisophthalate, sodium salt (15.19 grams), tris(2-hydroxyethyl)trimellitate (2.23 grams), sodium acetate (0.76 grams), manganese(II) acetate tetrahydrate (0.2363 grams), and antimony(III) trioxide (0.1902 grams). The reaction mixture was stirred and heated to 180° C. under a slow nitrogen purge. After achieving 180° C., the reaction mixture was heated to 200° C. over 0.5 hours with stirring under a slow nitrogen purge. The resulting reaction mixture was stirred at 200° C. under a slight nitrogen purge for 1 hour. The reaction mixture was then heated to 275° C. over 0.5 hours with stirring under a slight nitrogen purge. The resulting reaction mixture was stirred at 275° C. for 1 hour while under a slight nitrogen purge. 77.2 grams of a colorless distillate was collected over this heating cycle. The reaction mixture was then staged to full vacuum with stirring at 275° C. The resulting reaction mixture was stirred for 3.4 hours under full vacuum (pressure less than 100 mtorr). The vacuum was then released with nitrogen and the reaction mass allowed to cool to room temperature. An additional 54.6 grams of distillate was recovered and 403.7 grams of a solid product was recovered.

The sample was measured for inherent viscosity, as described above, and was found to have an inherent viscosity (IV) of 0.58 dL/g.

The sample underwent differential scanning calorimetry (DSC) analysis. A glass transition temperature (Tg) was found with an onset temperature of 47.6° C., a midpoint temperature of 50.4° C., and an endpoint temperature of 53.1° C. A crystalline melting temperature (Tm) was observed at 214.9° C. (28.0 J/g).

This sample underwent biodegradation testing as described above. After 26.3 days of composting, 7.5 weight percent of the sample was found to have been biodegraded.

Comparative Example 2

To a 1.0 liter glass flask was added bis(2-hydroxyethyl) terephthalate (635.60 grams), dimethyl glutarate (2.05 grams), dimethyl 5-sulfoisophthalate, sodium salt (15.19 grams), tris(2-hydroxyethyl)trimellitate (2.23 grams), polyethylene glycol (average molecular weight=1450, 42.38 grams), sodium acetate (0.76 grams), manganese(II) acetate tetrahydrate (0.2363 grams), and antimony(III) trioxide (0.1902 grams). The reaction mixture was stirred and heated to 180° C. under a slow nitrogen purge. After achieving 180° C., the reaction mixture was heated to 200° C. over 0.5 hours with stirring under a slow nitrogen purge. The resulting reaction mixture was stirred at 200° C. under a slight nitrogen purge for 1.1 hours. The reaction mixture was then heated to 275° C. over 0.8 hours with stirring under a slight nitrogen purge. The resulting reaction mixture was stirred at 275° C. for 1.0 hour while under a slight nitrogen purge. 82.4 grams of a colorless distillate was collected over this heating cycle. The reaction mixture was then staged to full vacuum with stirring at 275° C. The resulting reaction mixture was stirred for 2.3 hours under full vacuum (pressure less than 100 mtorr). The vacuum was then released with nitrogen and the reaction mass allowed to cool to room temperature. An additional 62.6 grams of distillate was recovered and 423.6 grams of a solid product was recovered.

The sample was measured for inherent viscosity (IV) as described above, and was found to have an IV of 0.61 dL/g.

The sample underwent differential scanning calorimetry (DSC) analysis. A crystalline melting temperature (Tm) was observed at 247.6° C. (37.3 J/g).

This sample underwent biodegradation testing as described above. After 26.3 days of composting, 9.8 weight percent of the sample was found to have been biodegraded.

Example 1

To a 1.0 liter glass flask was added bis(2-hydroxyethyl) terephthalate (508.48 grams), dimethyl glutarate (82.14 grams), dimethyl 5-sulfoisophthalate, sodium salt (15.19 grams), tris(2-hydroxyethyl)trimellitate (2.23 grams), polyethylene glycol (average molecular weight=1450, 42.38 grams), sodium acetate (0.76 grams), manganese(II) acetate tetrahydrate (0.2363 grams), and antimony(III) trioxide (0.1902 grams). The reaction mixture was stirred and heated to 180° C. under a slow nitrogen purge. After achieving 180° C., the reaction mixture was heated to 200° C. over 0.2 hours with stirring under a slow nitrogen purge. The resulting reaction mixture was stirred at 200° C. under a slight nitrogen purge for 1 hour. The reaction mixture was then heated to 275° C. over 1.3 hours with stirring under a slight nitrogen purge. The resulting reaction mixture was stirred at 275° C. for 1.2 hour while under a slight nitrogen purge. 67.0 grams of a colorless distillate was collected over this heating cycle. The reaction mixture was then staged to full vacuum with stirring at 275° C. The resulting reaction mixture was stirred for 3.2 hours under full vacuum (pressure less than 100 mtorr). The vacuum was then released with nitrogen and the reaction mass allowed to cool to room temperature. An additional 68.2 grams of distillate was recovered and 400.0 grams of a solid product was recovered.

The sample was measured for laboratory relative viscosity (LRV) as described above and was found to have an LRV of 25.62. This sample was calculated to have an inherent viscosity of 0.71 dL/g.

The sample underwent differential scanning calorimetry (DSC) analysis. A glass transition temperature (Tg) was found with an onset temperature of 37.6° C., a midpoint temperature of 38.9° C., and an endpoint temperature of 39.7° C. A broad crystalline melting temperature (Tm) was observed at 206.6° C. (20.6 J/g).

This sample underwent biodegradation testing as described above. After 26.5 days of composting, 22.7 weight percent of the sample was found to have been biodegraded.

Example 2

To a 250 milliliter glass flask was added bis(2-hydroxyethyl)terephthalate (99.15 grams), dimethyl glutarate (16.02 grams), dimethyl 5-sulfoisophthalate, sodium salt (2.96 grams), polyethylene glycol (average molecular weight=1000) (8.14 grams), manganese(II) acetate tetrahydrate (0.042 grams), and antimony(III) trioxide (0.034 grams). The reaction mixture was stirred and heated to 180° C. under a slow nitrogen purge. After achieving 180° C., the reaction mixture was heated to 200° C. over 0.4 hours with stirring under a slow nitrogen purge. The resulting reaction mixture was stirred at 200° C. under a slight nitrogen purge for 1.1 hours. The reaction mixture was then heated to 275° C. over 1.6 hours with stirring under a slight nitrogen purge. The resulting reaction mixture was stirred at 275° C. for 1.2 hours while under a slight nitrogen purge. 9.67 grams of a colorless distillate was collected over this heating cycle. The reaction mixture was then staged to full vacuum with stirring at 275° C. The resulting reaction mixture was stirred for 4.0 hours under full vacuum (pressure less than 100 mtorr). The vacuum was then released with nitrogen and the reaction mass allowed to cool to room temperature. An additional 7.12 grams of distillate was recovered and 100.54 grams of a solid product was recovered.

The sample was measured for laboratory relative viscosity (LRV) as described above and was found to have an LRV of 26.32. This sample was calculated to have an inherent viscosity of 0.72 dL/g.

The sample underwent differential scanning calorimetry (DSC) analysis. A broad crystalline melting temperature (Tm) was observed at 169.0° C. (14.1 J/g).

Example 3

To a 250 milliliter glass flask was added bis(2-hydroxyethyl)terephthalate (99.15 grams), dimethyl glutarate (16.02 grams), dimethyl 5-sulfoisophthalate, sodium salt (2.96 grams), poly(ethylene glycol) (average molecular weight=2000) (8.14 grams), manganese(II) acetate tetrahydrate (0.042 grams), and antimony(III) trioxide (0.034 grams). The reaction mixture was stirred and heated to 180° C. under a slow nitrogen purge. After achieving 180° C., the reaction mixture was heated to 200° C. over 0.3 hours with stirring under a slow nitrogen purge. The resulting reaction mixture was stirred at 200° C. under a slight nitrogen purge for 1.1 hours. The reaction mixture was then heated to 275° C. over 1.3 hours with stirring under a slight nitrogen purge. The resulting reaction mixture was stirred at 275° C. for 1.0 hour while under a slight nitrogen purge. 7.60 grams of a colorless distillate was collected over this heating cycle. The reaction mixture was then staged to full vacuum with stirring at 275° C. The resulting reaction mixture was stirred for 1.8 hours under full vacuum (pressure less than 100 mtorr). The vacuum was then released with nitrogen and the reaction mass allowed to cool to room temperature. An additional 12.08 grams of distillate was recovered and 80.89 grams of a solid product was recovered.

The sample was measured for laboratory relative viscosity (LRV) as described above and was found to have an LRV of 34.54. This sample was calculated to have an inherent viscosity of 0.87 dL/g.

The sample underwent differential scanning calorimetry (DSC) analysis. A broad crystalline melting temperature (Tm) was observed at 190.0° C. (19.7 J/g).

Example 4

To a 250 milliliter glass flask was added bis(2-hydroxyethyl)terephthalate (99.15 grams), dimethyl glutarate (16.02 grams), dimethyl 5-sulfoisophthalate, sodium salt (2.96 grams), poly(ethylene glycol)-block-poly(propylene glycol)-block-poly(ethylene glycol) (10 weight percent poly(ethylene glycol) content, CAS #9003-11-6, average molecular weight=1100)) (8.14 grams), manganese(II) acetate tetrahydrate (0.042 grams), and antimony(III) trioxide (0.034 grams). The reaction mixture was stirred and heated to 180° C. under a slow nitrogen purge. After achieving 180° C., the reaction mixture was heated to 200° C. over 0.3 hours with stirring under a slow nitrogen purge. The resulting reaction mixture was stirred at 200° C. under a slight nitrogen purge for 1.0 hour. The reaction mixture was then heated to 275° C. over 1.3 hours with stirring under a slight nitrogen purge. The resulting reaction mixture was stirred at 275° C. for 1.0 hour while under a slight nitrogen purge. 23.88 grams of a colorless distillate was collected over this heating cycle. The reaction mixture was then staged to full vacuum with stirring at 275° C. The resulting reaction mixture was stirred for 4.2 hours under full vacuum (pressure less than 100 mtorr). The vacuum was then released with nitrogen and the reaction mass allowed to cool to room temperature. An additional 2.87 grams of distillate was recovered and 81.78 grams of a solid product was recovered.

The sample was measured for laboratory relative viscosity (LRV) as described above and was found to have an LRV of 17.25. This sample was calculated to have an inherent viscosity of 0.56 dL/g.

The sample underwent differential scanning calorimetry (DSC) analysis. A broad crystalline melting temperature (Tm) was observed at 207.1° C. (27.0 J/g).

Example 5

To a 250 milliliter glass flask was added bis(2-hydroxyethyl)terephthalate (99.15 grams), dimethyl glutarate (16.02 grams), dimethyl 5-sulfoisophthalate, sodium salt (2.96 grams), poly(ethylene glycol)-block-poly(propylene glycol)-block-poly(ethylene glycol) (10 weight percent poly(ethylene glycol) content, CAS #9003-11-6, average molecular weight=2000)) (8.14 grams), manganese(II) acetate tetrahydrate (0.042 grams), and antimony(III) trioxide (0.034 grams). The reaction mixture was stirred and heated to 180° C. under a slow nitrogen purge. After achieving 180° C., the reaction mixture was heated to 200° C. over 1.0 hours with stirring under a slow nitrogen purge. The resulting reaction mixture was stirred at 200° C. under a slight nitrogen purge for 1.0 hour. The reaction mixture was then heated to 275° C. over 0.5 hours with stirring under a slight nitrogen purge. The resulting reaction mixture was stirred at 275° C. for 1.0 hour while under a slight nitrogen purge. 10.93 grams of a colorless distillate was collected over this heating cycle. The reaction mixture was then staged to full vacuum with stirring at 275° C. The resulting reaction mixture was stirred for 2.3 hours under full vacuum (pressure less than 100 mtorr). The vacuum was then released with nitrogen and the reaction mass allowed to cool to room temperature. An additional 8.31 grams of distillate was recovered and 87.70 grams of a solid product was recovered.

The sample was measured for laboratory relative viscosity (LRV) as described above and was found to have an LRV of 26.27. This sample was calculated to have an inherent viscosity of 0.72 dL/g.

The sample underwent differential scanning calorimetry (DSC) analysis. A broad crystalline melting temperature (Tm) was observed at 185.6° C. (6.5 J/g).

Example 6

To a 1.0 liter glass flask was added bis(2-hydroxyethyl) terephthalate (508.48 grams), dimethyl glutarate (82.14 grams), dimethyl 5-sulfoisophthalate, sodium salt (15.19 grams), tris(2-hydroxyethyl)trimellitate (2.23 grams), polyethylene glycol (average molecular weight=1450, 42.38 grams), sodium acetate (0.76 grams), manganese(II) acetate tetrahydrate (0.2363 grams), antimony(III) trioxide (0.1902 grams) and a Fuji Silica 310 P (27.88 grams). The reaction mixture was stirred and heated to 180° C. under a slow nitrogen purge. After achieving 180° C., the reaction mixture was heated to 200° C. over 1.1 hours with stirring under a slow nitrogen purge. The resulting reaction mixture was stirred at 200° C. under a slight nitrogen purge for 1 hour. The reaction mixture was then heated to 275° C. over 1.5 hours with stirring under a slight nitrogen purge. The resulting reaction mixture was stirred at 275° C. for 1 hour while under a slight nitrogen purge. 68.40 grams of a colorless distillate was collected over this heating cycle. The reaction mixture was then staged to full vacuum with stirring at 275° C. The resulting reaction mixture was stirred for 3.2 hours under full vacuum (pressure less than 100 mtorr). The vacuum was then released with nitrogen and the reaction mass allowed to cool to room temperature. An additional 56.7 grams of distillate was recovered and 482.9 grams of a solid product was recovered.

The sample was measured for laboratory relative viscosity (LRV) as described above and was found to have an LRV of 12.85. This sample was calculated to have an inherent viscosity of 0.48 dL/g.

The sample underwent differential scanning calorimetry (DSC) analysis. A glass transition temperature (Tg) was found with an onset temperature of 105.6° C., a midpoint temperature of 106.4° C., and an endpoint temperature of 107.2° C. A crystalline melting temperature (Tm) was observed at 203.9° C. (21.2 J/g).

This sample underwent biodegradation testing as described above. After 26.5 days of composting, 13.1 weight percent of the sample was found to have been biodegraded.

Example 7

To a 1.0 liter glass flask was added bis(2-hydroxyethyl) terephthalate (508.48 grams), dimethyl glutarate (82.14 grams), dimethyl 5-sulfoisophthalate, sodium salt (15.19 grams), tris(2-hydroxyethyl)trimellitate (2.23 grams), polyethylene glycol (average molecular weight=1450, 42.38 grams), sodium acetate (0.76 grams), manganese(II) acetate tetrahydrate (0.2363 grams), antimony(III) trioxide (0.1902 grams) and a kaolin (27.88 grams). The reaction mixture was stirred and heated to 180° C. under a slow nitrogen purge. After achieving 180° C., the reaction mixture was heated to 200° C. over 0.3 hours with stirring under a slow nitrogen purge. The resulting reaction mixture was stirred at 200° C. under a slight nitrogen purge for 0.9 hours. The reaction mixture was then heated to 275° C. over 2.0 hours with stirring under a slight nitrogen purge. The resulting reaction mixture was stirred at 275° C. for 0.8 hours while under a slight nitrogen purge. 81.7 grams of a colorless distillate was collected over this heating cycle. The reaction mixture was then staged to full vacuum with stirring at 275° C. The resulting reaction mixture was stirred for 2.4 hours under full vacuum (pressure less than 100 mtorr). The vacuum was then released with nitrogen and the reaction mass allowed to cool to room temperature. An additional 54.6 grams of distillate was recovered and 473.3 grams of a solid product was recovered.

The sample was measured for laboratory relative viscosity (LRV) as described above and was found to have an LRV of 23.26. This sample was calculated to have an inherent viscosity of 0.67 dL/g.

The sample underwent differential scanning calorimetry (DSC) analysis. A glass transition temperature (Tg) was found with an onset temperature of 41.1° C., a midpoint temperature of 45.3° C., and an endpoint temperature of 48.9° C. A crystalline melting temperature (Tm) was observed at 203.5° C. (22.9 J/g).

This sample underwent biodegradation testing as described above. After 26.5 days of composting, 22.1 weight percent of the sample was found to have been biodegraded.

Example 8

To a 1.0 liter glass flask was added bis(2-hydroxyethyl) terephthalate (508.48 grams), dimethyl glutarate (82.14 grams), dimethyl 5-sulfoisophthalate, sodium salt (15.19 grams), tris(2-hydroxyethyl)trimellitate (2.23 grams), polyethylene glycol (average molecular weight=1450, 42.38 grams), sodium acetate (0.76 grams), manganese(II) acetate tetrahydrate (0.2363 grams), antimony(III) trioxide (0.1902 grams) and Cloisite 30B (27.88 grams, supplied by Southern Clay, Inc., a natural montomorillonite clay coated with a quarternary ammonium tallow derivative (bis(2-hyrdroxyethyl)-methyl-tallow ammonium chloride)). The reaction mixture was stirred and heated to 180° C. under a slow nitrogen purge. After achieving 180° C., the reaction mixture was heated to 200° C. over 1.1 hours with stirring under a slow nitrogen purge. The resulting reaction mixture was stirred at 200° C. under a slight nitrogen purge for 1 hour. The reaction mixture was then heated to 275° C. over 1.2 hours with stirring under a slight nitrogen purge. The resulting reaction mixture was stirred at 275° C. for 1 hour while under a slight nitrogen purge. 83.2 grams of a colorless distillate was collected over this heating cycle. The reaction mixture was then staged to full vacuum with stirring at 275° C. The resulting reaction mixture was stirred for 2.8 hours under full vacuum (pressure less than 100 mtorr). The vacuum was then released with nitrogen and the reaction mass allowed to cool to room temperature. An additional 51.4 grams of distillate was recovered and 454.3 grams of a solid product was recovered.

The sample was measured for laboratory relative viscosity (LRV) as described above and was found to have an LRV of 24.42. This sample was calculated to have an inherent viscosity of 0.69 dL/g.

The sample underwent differential scanning calorimetry (DSC) analysis. A glass transition temperature (Tg) was found with an onset temperature of 35.3° C., a midpoint temperature of 35.5° C., and an endpoint temperature of 35.9° C. A crystalline melting temperature (Tm) was observed at 188.3° C. (20.9 J/g).

This sample underwent biodegradation testing as described above. After 26.5 days of composting, 24.2 weight percent of the sample was found to have been biodegraded.

Example 9

To a 1.0 liter glass flask was added bis(2-hydroxyethyl) terephthalate (508.48 grams), dimethyl glutarate (82.14 grams), dimethyl 5-sulfoisophthalate, sodium salt (15.19 grams), tris(2-hydroxyethyl)trimellitate (2.23 grams), polyethylene glycol (average molecular weight=1450, 42.38 grams), sodium acetate (0.76 grams), manganese(II) acetate tetrahydrate (0.2363 grams), antimony(III) trioxide (0.1902 grams) and Cloisite Na (27.88 grams, a Southern Clay product which is a natural montomorillonite clay). The reaction mixture was stirred and heated to 180° C. under a slow nitrogen purge. After achieving 180° C., the reaction mixture was heated to 200° C. over 0.8 hours with stirring under a slow nitrogen purge. The resulting reaction mixture was stirred at 200° C. under a slight nitrogen purge for 0.9 hours. The reaction mixture was then heated to 275° C. over 0.7 hours with stirring under a slight nitrogen purge. The resulting reaction mixture was stirred at 275° C. for 0.9 hours while under a slight nitrogen purge. 91.8 grams of a colorless distillate was collected over this heating cycle. The reaction mixture was then staged to full vacuum with stirring at 275° C. The resulting reaction mixture was stirred for 2.3 hours under full vacuum (pressure less than 100 mtorr). The, vacuum was then released with nitrogen and the reaction mass allowed to cool to room temperature. An additional 56.6 grams of distillate was recovered and 445.1 grams of a solid product was recovered.

The sample was measured for laboratory relative viscosity (LRV) as described above and was found to have an LRV of 24.39. This sample was calculated to have an inherent viscosity of 0.69 dL/g.

The sample underwent differential scanning'calorimetry (DSC) analysis. Within the first heating cycle, a glass transition temperature (Tg) was found with an onset temperature of 46.0° C., a midpoint temperature of 50.6° C., and an endpoint temperature of 53.2° C. This glass transition temperature was not observed in the second heating cycle of the DSC experiment. During the second heating cycle of the DSC experiment, a crystalline melting temperature (Tm) was observed at 209.8° C. (25.4 J/g).

This sample underwent biodegradation testing as described above. After 26.5 days of composting, 22.7 weight percent of the sample was found to have been biodegraded.

Example 10

To a 1.0 liter glass flask was added bis(2-hydroxyethyl) terephthalate (508.48 grams), dimethyl glutarate (82.14 grams), dimethyl 5-sulfoisophthalate, sodium salt (15.19 grams), tris(2-hydroxyethyl)trimellitate (2.23 grams), polyethylene glycol (average molecular weight=1450, 42.38 grams), sodium acetate (0.76 grams), manganese(II) acetate tetrahydrate (0.2363 grams), antimony(III) trioxide (0.1902 grams) and a Claytone 2000 (27.88 grams, a Southern Clay, Inc., product which is an organophilic smectite clay). The reaction mixture was stirred and heated to 180° C. under a slow nitrogen purge. After achieving 180° C., the reaction mixture was heated to 200° C. over 0.6 hours with stirring under a slow nitrogen purge. The resulting reaction mixture was stirred at 200° C. under a slight nitrogen purge for 0.9 hours. The reaction mixture was then heated to 275° C. over 1.5 hours with stirring under a slight nitrogen purge. The resulting reaction mixture was stirred at 275° C. for 1.1 hours while under a slight nitrogen purge. 62.6 grams of a colorless distillate was collected over this heating cycle. The reaction mixture was then staged to full vacuum with stirring at 275° C. The resulting reaction mixture was stirred for 1.3 hours under full vacuum (pressure less than 100 mtorr). The vacuum was then released with nitrogen and the reaction mass allowed to cool to room temperature. An additional 53.7 grams of distillate was recovered and 509.2 grams of a solid product was recovered.

The sample was measured for laboratory relative viscosity (LRV) as described above and was found to have an LRV of 28.59. This sample was calculated to have an inherent viscosity of 0.76 dL/g.

The sample underwent differential scanning calorimetry (DSC) analysis. A glass transition temperature (Tg) was found with an onset temperature of 26.0° C., a midpoint temperature of 28.2° C., and an endpoint temperature of 30.1° C. A crystalline melting temperature (Tm) was observed at 181.2° C. (18.9 J/g).

This sample underwent biodegradation testing as described above. After 26.5 days of composting, 26.5 weight percent of the sample was found to have been biodegraded.

Example 11

To a 1.0 liter glass flask was added bis(2-hydroxyethyl) terephthalate (508.48 grams), dimethyl glutarate (82.14 grams), dimethyl 5-sulfoisophthalate, sodium salt (15.19 grams), tris(2-hydroxyethyl)trimellitate (2.23 grams), polyethylene glycol (average molecular weight=1450, 42.38 grams), sodium acetate (0.76 grams), manganese(II) acetate tetrahydrate (0.2363 grams), antimony(III) trioxide (0.1902 grams) and a Garamite 1958 (27.88 grams, a Southern Clay, Inc., product which is a mixture of minerals). The reaction mixture was stirred and heated to 180° C. under a slow nitrogen purge. After achieving 180° C., the reaction mixture was heated to 200° C. over 1.0 hour with stirring under a slow nitrogen purge. The resulting reaction mixture was stirred at 200° C. under a slight nitrogen purge for 1.0 hour. The reaction mixture was then heated to 275° C. over 0.67 hours with stirring under a slight nitrogen purge. The resulting reaction mixture was stirred at 275° C. for 1.0 hour while under a slight nitrogen purge. 88.5 grams of a colorless distillate was collected over this heating cycle. The reaction mixture was then staged to full vacuum with stirring at 275° C. The resulting reaction mixture was stirred for 2.3 hours under full vacuum (pressure less than 100 mtorr). The vacuum was then released with nitrogen and the reaction mass allowed to cool to room temperature. An additional 56.7 grams of distillate was recovered and 436.6 grams of a solid product was recovered.

The sample was measured for laboratory relative viscosity (LRV) as described above and was found to have an LRV of 24.97. This sample was calculated to have an inherent viscosity of 0.70 dL/g.

The sample underwent differential scanning calorimetry (DSC) analysis. A crystalline melting temperature (Tm) was observed at 208.6° C. (22.3 J/g).

This sample underwent biodegradation testing as described above. After 22.9 days of composting, 13.6 weight percent of the sample was found to have been biodegraded.

Example 12

To a 1.0 liter glass flask was added bis(2-hydroxyethyl) terephthalate (508.48 grams), dimethyl glutarate (82.14 grams), dimethyl 5-sulfoisophthalate, sodium salt (15.19 grams), tris(2-hydroxyethyl)trimellitate (2.23 grams), polyethylene glycol (average molecular weight=1450, 42.38 grams), sodium acetate (0.76 grams), manganese(II) acetate tetrahydrate (0.2363 grams), antimony(III) trioxide (0.1902 grams) and a Laponite RD (27.88 grams, a Southern Clay, Inc., product which is a synthetic colloidal clay). The reaction mixture was stirred and heated to 180° C. under a slow nitrogen purge. After achieving 180° C., the reaction mixture was heated to 200° C. over 0.4 hours with stirring under a slow nitrogen purge. The resulting reaction mixture was stirred at 200° C. under a slight nitrogen purge for 0.8 hours. The reaction mixture was then heated to 275° C. over 0.9 hours with stirring under a slight nitrogen purge. The resulting reaction mixture was stirred at 275° C. for 1.3 hours while under a slight nitrogen purge. 112.4 grams of a colorless distillate was collected over this heating cycle. The reaction mixture was then staged to full vacuum with stirring at 275° C. The resulting reaction mixture was stirred for 2.8 hours under full vacuum (pressure less than 100 mtorr). The vacuum was then released with nitrogen and the reaction mass allowed to cool to room temperature. An additional 36.1 grams of distillate was recovered and 425.0 grams of a solid product was recovered.

The sample was measured for laboratory relative viscosity (LRV) as described above and was found to have an LRV of 21.35. This sample was calculated to have an inherent viscosity of 0.63 dL/g.

The sample underwent differential scanning calorimetry (DSC) analysis. A crystalline melting temperature (Tm) was observed at 217.5° C. (27.2 J/g).

This sample underwent biodegradation testing as described above. After 22.9 days of composting, 10.0 weight percent of the sample was found to have been biodegraded.

Example 13

To a 1.0 liter glass flask was added bis(2-hydroxyethyl) terephthalate (508.48 grams), dimethyl glutarate (82.14 grams), dimethyl 5-sulfoisophthalate, sodium salt (15.19 grams), tris(2-hydroxyethyl)trimellitate (2.23 grams), polyethylene glycol (average molecular weight=1450, 42.38 grams), sodium acetate (0.76 grams), manganese(II) acetate tetrahydrate (0.2363 grams), antimony(III) trioxide (0.1902 grams) and a Laponite RDS (27.88 grams, a Southern Clay, Inc., product which is a synthetic layered silicate with a inorganic polyphosphate peptiser). The reaction mixture was stirred and heated to 180° C. under a slow nitrogen purge. After achieving 180° C., the reaction mixture was heated to 200° C. over 0.2 hours with stirring under a slow nitrogen purge. The resulting reaction mixture was stirred at 200° C. under a slight nitrogen purge for 1.1 hours. The reaction mixture was then heated to 275° C. over 0.8 hours with stirring under a slight nitrogen purge. The resulting reaction mixture was stirred at 275° C. for 1.0 hour while under a slight nitrogen purge. 111.3 grams of a colorless distillate was collected over this heating cycle. The reaction mixture was then staged to full vacuum with stirring at 275° C. The resulting reaction mixture was stirred for 2.9 hours under full vacuum (pressure less than 100 mtorr). The vacuum was then released with nitrogen and the reaction mass allowed to cool to room temperature. An additional 38.9 grams of distillate was recovered and 450.6 grams of a solid product was recovered.

The sample was measured for laboratory relative viscosity (LRV) as described above and was found to have an LRV of 22.40. This sample was calculated to have an inherent viscosity of 0.65 dL/g.

The sample underwent differential scanning calorimetry (DSC) analysis. A crystalline melting temperature (Tm) was observed at 216.3° C. (26.5 J/g).

This sample underwent biodegradation testing as described above. After 22.9 days of composting, 10.1 weight percent of the sample was found to have been biodegraded.

Example 14

To a 1.0 liter glass flask was added bis(2-hydroxyethyl) terephthalate (508.48 grams), dimethyl glutarate (82.14 grams), dimethyl 5-sulfoisophthalate, sodium salt (15.19 grams), tris(2-hydroxyethyl)trimellitate (2.23 grams), polyethylene glycol (average molecular weight=1450, 42.38 grams), sodium acetate (0.76 grams), manganese(II) acetate tetrahydrate (0.2363 grams), antimony(III) trioxide (0.1902 grams) and a Gelwhite L (27.88 grams. A Southern Clay, Inc., product which is a montmorillonite clay from white bentonite). The reaction mixture was stirred and heated to 180° C. under a slow nitrogen purge. After achieving 180° C., the reaction mixture was heated to 200° C. over 0.8 hours with stirring under a slow nitrogen purge. The resulting reaction mixture was stirred at 200° C. under a slight nitrogen purge for 1.1 hours. The reaction mixture was then heated to 275° C. over 1.7 hours with stirring under a slight nitrogen purge. The resulting reaction mixture was stirred at 275° C. for 1.0 hour while under a slight nitrogen purge. 57.1 grams of a colorless distillate was collected over this heating cycle. The reaction mixture was then staged to full vacuum with stirring at 275° C. The resulting reaction mixture was stirred for 3.4 hours under full vacuum (pressure less than 100 mtorr). The vacuum was then released with nitrogen and the reaction mass allowed to cool to room temperature. An additional 63.5 grams of distillate was recovered and 522.0 grams of a solid product was recovered.

The sample was measured for inherent viscosity (IV) as described above and was found to have an inherent viscosity of 0.58 dL/g.

The sample underwent differential scanning calorimetry (DSC) analysis. A crystalline melting temperature (Tm) was observed at 181.6° C. (17.2 J/g).

This sample underwent biodegradation testing as described above. After 22.9 days of composting, 16.4 weight percent of the sample was found to have been biodegraded.

Example 15

To a 1.0 liter glass flask was added bis(2-hydroxyethyl) terephthalate (508.48 grams), dimethyl glutarate (82.14 grams), dimethyl 5-sulfoisophthalate, sodium salt (15.19 grams), tris(2-hydroxyethyl)trimellitate (2.23 grams), polyethylene glycol (average molecular weight=1450, 42.38 grams), sodium acetate (0.76 grams), manganese(II) acetate tetrahydrate (0.2363 grams), antimony(III) trioxide (0.1902 grams) and a Gelwhite MAS 100 (27.88 grams, a Southern Clay, Inc., product which is a white smectite clay (magnesium aluminum silicate)). The reaction mixture was stirred and heated to 180° C. under a slow nitrogen purge. After achieving 180° C., the reaction mixture was heated to 200° C. over 0.3 hours with stirring under a slow nitrogen purge. The resulting reaction mixture was stirred at 200° C. under a slight nitrogen purge for 1.1 hours. The reaction mixture was then heated to 275° C. over 0.7 hours with stirring under a slight nitrogen purge. The resulting reaction mixture was stirred at 275° C. for 1.1 hours while under a slight nitrogen purge. 87.5 grams of a colorless distillate was collected over this heating cycle. The reaction mixture was then staged to full vacuum with stirring at 275° C. The resulting reaction mixture was stirred for 1.8 hours under full vacuum (pressure less than 100 mtorr). The vacuum was then released with nitrogen and the reaction mass allowed to cool to room temperature. An additional 27.3 grams of distillate was recovered and 524.3 grams of a solid product was recovered.

The sample was measured for laboratory relative viscosity (LRV) as described above and was found to have an LRV of 32.87. This sample was calculated to have an inherent viscosity of 0.84 dL/g.

The sample underwent differential scanning calorimetry (DSC) analysis. A glass transition temperature (Tg) was found with an onset temperature of 26.0° C., a midpoint temperature of 28.2° C., and an endpoint temperature of 30.1° C. A crystalline melting temperature (Tm) was observed at 171.1° C. (1.2 J/g).

This sample underwent biodegradation testing as described above. After 22.9 days of composting, 12.2 weight percent of the sample was found to have been biodegraded.

Example 16

To a 1.0 liter glass flask was added bis(2-hydroxyethyl) terephthalate (508.48 grams), dimethyl glutarate (82.14 grams), dimethyl 5-sulfoisophthalate, sodium salt (15.19 grams), tris(2-hydroxyethyl)trimellitate (2.23 grams), polyethylene glycol (average molecular weight=1450, 42.38 grams), sodium acetate (0.76 grams), manganese(II) acetate tetrahydrate (0.2363 grams), antimony(III) trioxide (0.1902 grams) and a talc (27.88 grams). The reaction mixture was stirred and heated to 180° C. under a slow nitrogen purge. After achieving 180° C., the reaction mixture was heated to 200° C. over 0.2 hours with stirring under a slow nitrogen purge. The resulting reaction mixture was stirred at 200° C. under a slight nitrogen purge for 0.9 hours. The reaction mixture was then heated to 275° C. over 0.7 hours with stirring under a slight nitrogen purge. The resulting reaction mixture was stirred at 275° C. for 1.0 hour while under a slight nitrogen purge. 91.0 grams of a colorless distillate was collected over this heating cycle. The reaction mixture was then staged to full vacuum with stirring at 275° C. The resulting reaction mixture was stirred for 3.2 hours under full vacuum (pressure less than 100 mtorr). The vacuum was then released with nitrogen and the reaction mass allowed to cool to room temperature. An additional 49.6 grams of distillate was recovered and 442.8 grams of a solid product was recovered.

The sample was measured for laboratory relative viscosity (LRV) as described above and was found to have an LRV of 25.72. This sample was calculated to have an inherent viscosity of 0.71 dL/g.

The sample underwent differential scanning calorimetry (DSC) analysis. A crystalline melting temperature (Tm) was observed at 207.0° C. (19.2 J/g).

This sample underwent biodegradation testing as described above. After 23.6 days of composting, 26.6 weight percent of the sample was found to have been biodegraded.

Example 17

To a 1.0 liter glass flask was added bis(2-hydroxyethyl) terephthalate (508.48 grams), dimethyl glutarate (82.14 grams), dimethyl 5-sulfoisophthalate, sodium salt (15.19 grams), tris(2-hydroxyethyl)trimellitate (2.23 grams), polyethylene glycol (average molecular weight=1450, 42.38 grams), sodium acetate (0.76 grams), manganese(II) acetate tetrahydrate (0.2363 grams), antimony(III) trioxide (0.1902 grams) and a mica (27.88 grams). The reaction mixture was stirred and heated to 180° C. under a slow nitrogen purge. After achieving 180° C., the reaction mixture was heated to 200° C. over 0.5 hours with stirring under a slow nitrogen purge. The resulting reaction mixture was stirred at 200° C. under a slight nitrogen purge for 1.1 hours. The reaction mixture was then heated to 275° C. over 0.8 hours with stirring under a slight nitrogen purge. The resulting reaction mixture was stirred at 275° C. for 1.2 hours while under a slight nitrogen purge. 91.0 grams of a colorless distillate was collected over this heating cycle. The reaction mixture was then staged to full vacuum with stirring at 275° C. The resulting reaction mixture was stirred for 2.4 hours under full vacuum (pressure less than 100 mtorr). The vacuum was then released with nitrogen and the reaction mass allowed to cool to room temperature. An additional 53.1 grams of distillate was recovered and 446.1 grams of a solid product was recovered.

The sample was measured for laboratory relative viscosity (LRV) as described above and was found to have an LRV of 24.07. This sample was calculated to have an inherent viscosity of 0.68 dL/g.

The sample underwent differential scanning calorimetry (DSC) analysis. A glass transition temperature (Tg) was found with an onset temperature of 37.4° C., a midpoint temperature of 38.1° C., and an endpoint temperature of 38.3° C. A crystalline melting temperature (Tm) was observed at 207.2° C. (19.9 J/g).

This sample underwent biodegradation testing as described above. After 23.6 days of composting, 18.0 weight percent of the sample was found to have been biodegraded.

Example 18

To a 1.0 liter glass flask was added bis(2-hydroxyethyl) terephthalate (508.48 grams), dimethyl glutarate (82.14 grams), dimethyl 5-sulfoisophthalate, sodium salt (15.19 grams), tris(2-hydroxyethyl)trimellitate (2.23 grams), polyethylene glycol (average molecular weight=1450, 42.38 grams), sodium acetate (0.76 grams), manganese(II) acetate tetrahydrate (0.2363 grams), antimony(III) trioxide (0.1902 grams) and a 50 weight percent slurry of calcium carbonate in ethylene glycol (55.76 grams). The reaction mixture was stirred and heated to 180° C. under a slow nitrogen purge. After achieving 180° C., the reaction mixture was heated to 200° C. over 0.2 hours with stirring under a slow nitrogen purge. The resulting reaction mixture was stirred at 200° C. under a slight nitrogen purge for 0.9 hours. The reaction mixture was then heated to 275° C. over 0.8 hours with stirring under a slight nitrogen purge. The resulting reaction mixture was stirred at 275° C. for 1.8 hours while under a slight nitrogen purge. 100.6 grams of a colorless distillate was collected over this heating cycle. The reaction mixture was then staged to full vacuum with stirring at 275° C. The resulting reaction mixture was stirred for 2.4 hours under full vacuum (pressure less than 100 mtorr). The vacuum was then released with nitrogen and the reaction mass allowed to cool to room temperature. An additional 60.8 grams of distillate was recovered and 455.0 grams of a solid product was recovered.

The sample was measured for laboratory relative viscosity (LRV) as described above and was found to have an LRV of 25.13. This sample was calculated to have an inherent viscosity of 0.70 dL/g.

The sample underwent differential scanning calorimetry (DSC) analysis. A crystalline melting temperature (Tm) was observed at 209.1° C. (23.4 J/g).

This sample underwent biodegradation testing as described above. After 23.6 days of composting, 18.3 weight percent of the sample was found to have been biodegraded.

Example 19

To a 1.0 liter glass flask was added bis(2-hydroxyethyl) terephthalate (508.48 grams), dimethyl glutarate (82.14 grams), dimethyl 5-sulfoisophthalate, sodium salt (15.19 grams), tris(2-hydroxyethyl)trimellitate (2.23 grams), polyethylene glycol (average molecular weight=1450, 66.46 grams), sodium acetate (0.76 grams), manganese(II) acetate tetrahydrate (0.2363 grams), antimony(III) trioxide (0.1902 grams) and a 50 weight percent slurry of calcium carbonate in ethylene glycol (58.31 grams). The reaction mixture was stirred and heated to 180° C. under a slow nitrogen purge. After achieving 180° C., the reaction mixture was heated to 200° C. over 0.6 hours with stirring under a slow nitrogen purge. The resulting reaction mixture was stirred at 200° C. under a slight nitrogen purge for 0.8 hours. The reaction mixture was then heated to 275° C. over 0.8 hours with stirring under a slight nitrogen purge. The resulting reaction mixture was stirred at 275° C. for 1.3 hours while under a slight nitrogen purge. 95.9 grams of a colorless distillate was collected over this heating cycle. The reaction mixture was then staged to full vacuum with stirring at 275° C. The resulting reaction mixture was stirred for 2.8 hours under full vacuum (pressure less than 100 mtorr). The vacuum was then released with nitrogen and the reaction mass allowed to cool to room temperature. An additional 64.7 grams of distillate was recovered and 484.1 grams of a solid product was recovered.

The sample was measured for laboratory relative viscosity (LRV) as described above and was found to have an LRV of 19.97. This sample was calculated to have an inherent viscosity of 0.61 dL/g.

The sample underwent differential scanning calorimetry (DSC) analysis. A crystalline melting temperature (Tm) was observed at 206.9° C. (22.3 J/g).

This sample underwent biodegradation testing as described above. After 23.6 days of composting, 17.4 weight percent of the sample was found to have been biodegraded.

Example 20

To a 1.0 liter glass flask was added bis(2-hydroxyethyl) terephthalate (406.78 grams), dimethyl glutarate (65.71 grams), dimethyl 5-sulfoisophthalate, sodium salt (12.15 grams), tris(2-hydroxyethyl)trimellitate (1.78 grams), polyethylene glycol (average molecular weight=1450, 74.27 grams), sodium acetate (0.61 grams), manganese(II) acetate tetrahydrate (0.1890 grams), antimony(III) trioxide (0.1522 grams) and a 50 weight percent slurry of calcium carbonate in ethylene glycol (48.86 grams). The reaction mixture was stirred and heated to 180° C. under a slow nitrogen purge. After achieving 180° C., the reaction mixture was heated to 200° C. over 0.3 hours with stirring under a slow nitrogen purge. The resulting reaction mixture was stirred at 200° C. under a slight nitrogen purge for 1.0 hour. The reaction mixture was then heated to 275° C. over 0.8 hours with stirring under a slight nitrogen purge. The resulting reaction mixture was stirred at 275° C. for 1.1 hours while under a slight nitrogen purge. 77.5 grams of a colorless distillate was collected over this heating cycle. The reaction mixture was then staged to full vacuum with stirring at 275° C. The resulting reaction mixture was stirred for 2.8 hours under full vacuum (pressure less than 100 mtorr). The vacuum was then released with nitrogen and the reaction mass allowed to cool to room temperature. An additional 56.2 grams of distillate was recovered and 425.0 grams of a solid product was recovered.

The sample was measured for laboratory relative viscosity (LRV) as described above and was found to have an LRV of 30.98. This sample was calculated to have an inherent viscosity of 0.81 dL/g.

The sample underwent differential scanning calorimetry (DSC) analysis. A crystalline melting temperature (Tm) was observed at 204.9° C. (21.6 J/g).

This sample underwent biodegradation testing as described above. After 23.6 days of composting, 9.6 weight percent of the sample was found to have been biodegraded.

Example 21

To a 1.0 liter glass flask was added bis(2-hydroxyethyl) terephthalate (508.48 grams), dimethyl glutarate (82.14 grams), dimethyl 5-sulfoisophthalate, sodium salt (15.19 grams), tris(2-hydroxyethyl)trimellitate (2.23 grams), polyethylene glycol (average molecular weight=1450, 42.38 grams), sodium acetate (0.76 grams), manganese(II) acetate tetrahydrate (0.2363 grams), antimony(III) trioxide (0.1902 grams) and a calcium hydroxide (2.66 grams). The reaction mixture was stirred and heated to 180° C. under a slow nitrogen purge. After achieving 180° C., the reaction mixture was heated to 200° C. over 0.2 hours with stirring under a slow nitrogen purge. The resulting reaction mixture was stirred at 200° C. under a slight nitrogen purge for 1.3 hours. The reaction mixture was then heated to 275° C. over 1.3 hours with stirring under a slight nitrogen purge. The resulting reaction mixture was stirred at 275° C. for 1.3 hours while under a slight nitrogen purge. 70.0 grams of a colorless distillate was collected over this heating cycle. The reaction mixture was then staged to full vacuum with stirring at 275° C. The resulting reaction mixture was stirred for 2.7 hours under full vacuum (pressure less than 100 mtorr). The vacuum was then released with nitrogen and the reaction mass allowed to cool to room temperature. An additional 60.5 grams of distillate was recovered and 404.7 grams of a solid product was recovered.

The sample was measured for laboratory relative viscosity (LRV) as described above and was found to have an LRV of 23.36. This sample was calculated to have an inherent viscosity of 0.67 dL/g.

The sample underwent differential scanning calorimetry (DSC) analysis. A crystalline melting temperature (Tm) was observed at 206.5° C. (22.9 J/g).

This sample underwent biodegradation testing as described above. After 22.9 days of composting, 17.6 weight percent of the sample was found to have been biodegraded.

Example 22

To a 1.0 liter glass flask was added bis(2-hydroxyethyl) terephthalate (475.89 grams), dimethyl glutarate (102.67 grams), dimethyl 5-sulfoisophthalate, sodium salt (15.19 grams), tris(2-hydroxyethyl)trimellitate (2.21 grams), polyethylene glycol (average molecular weight=1450, 42.16 grams), sodium acetate (0.75 grams), manganese(II) acetate tetrahydrate (0.2351 grams), and antimony(III) trioxide (0.1893 grams). The reaction mixture was stirred and heated to 180° C. under a slow nitrogen purge. After achieving 180° C., the reaction mixture was heated to 200° C. over 0.2 hours with stirring under a slow nitrogen purge. The resulting reaction mixture was stirred at 200° C. under a slight nitrogen purge for 1 hour. The reaction mixture was then heated to 275° C. over 1.3 hours with stirring under a slight nitrogen purge. The resulting reaction mixture was stirred at 275° C. for 1 hour while under a slight nitrogen purge. 72.5 grams of a colorless distillate was collected over this heating cycle. The reaction mixture was then staged to full vacuum with stirring at 275° C. The resulting reaction mixture was stirred for 3.3 hours under full vacuum (pressure less than 100 mtorr). The vacuum was then released with nitrogen and the reaction mass allowed to cool to room temperature. An additional 56.4 grams of distillate was recovered and 413.7 grams of a solid product was recovered.

The sample was measured for laboratory relative viscosity (LRV) as described above and was found to have an LRV of 24.35. This sample was calculated to have an inherent viscosity of 0.69 dL/g.

The sample underwent differential scanning calorimetry (DSC) analysis. A glass transition temperature (Tg) was found with an onset temperature of 31.1° C., a midpoint temperature of 32.7° C., and an endpoint temperature of 34.2° C. A broad crystalline melting temperature (Tm) was observed at 196.0° C. (17.7 J/g).

This sample underwent biodegradation testing as described above. After 26.5 days of composting, 26.4 weight percent of the sample was found to have been biodegraded.

Example 23

To a 1.0 liter glass flask was added bis(2-hydroxyethyl) terephthalate (380.71 grams), dimethyl glutarate (82.14 grams), dimethyl 5-sulfoisophthalate, sodium salt (12.16 grams), tris(2-hydroxyethyl)trimellitate (1.77 grams), polyethylene glycol (average molecular weight=1450, 33.73 grams), sodium acetate (0.60 grams), manganese(II) acetate tetrahyd rate (0.1881 grams), antimony(III) trioxide (0.1514 grams) and a 50 weight percent slurry of calcium carbonate in ethylene glycol (210.81 grams). The reaction mixture was stirred and heated to 180° C. under a slow nitrogen purge. After achieving 180° C., the reaction mixture was heated to 200° C. over 0.2 hours with stirring under a slow nitrogen purge. The resulting reaction mixture was stirred at 200° C. under a slight nitrogen purge for 1 hour. The reaction mixture was then heated to 275° C. over 1.6 hours with stirring under a slight nitrogen purge. The resulting reaction mixture was stirred at 275° C. for 1 hour while under a slight nitrogen purge. 138.4 grams of a colorless distillate was collected over this heating cycle. The reaction mixture was then staged to full vacuum with stirring at 275° C. The resulting reaction mixture was stirred for 2.1 hours under full vacuum (pressure less than 100 mtorr). The vacuum was then released with nitrogen and the reaction mass allowed to cool to room temperature. An additional 60.3 grams of distillate was recovered and 446.3 grams of a solid product was recovered.

The sample was measured for laboratory relative viscosity (LRV) as described above and was found to have an LRV of 23.09. This sample was calculated to have an inherent viscosity of 0.66 dL/g.

The sample underwent differential scanning calorimetry (DSC) analysis. A glass transition temperature (Tg) was found with an onset temperature of 99.3° C., a midpoint temperature of 101.5° C., and an endpoint temperature of 103.7° C. A crystalline melting temperature (Tm) was observed at 182.3° C. (13.7 J/g).

This sample underwent biodegradation testing as described above. After 26.5 days of composting, 21.2 weight percent of the sample was found to have been biodegraded.

Example 24

To a 1.0 liter glass flask was added bis(2-hydroxyethyl) terephthalate (443.27 grams), dimethyl glutarate (123.20 grams), dimethyl 5-sulfoisophthalate, sodium salt (15.19 grams), tris(2-hydroxyethyl)trimellitate (1.52 grams), polyethylene glycol (average molecular weight=1450, 41.94 grams), sodium acetate (0.75 grams), manganese(II) acetate tetrahydrate (0.2339 grams), and antimony(III) trioxide (0.1883 grams). The reaction mixture was stirred and heated to 180° C. under a slow nitrogen purge. After achieving 180° C., the reaction mixture was heated to 200° C. over 0.2 hours with stirring under a slow nitrogen purge. The resulting reaction mixture was stirred at 200° C. under a slight nitrogen purge for 1 hour. The reaction mixture was then heated to 275° C. over 1.2 hours with stirring under a slight nitrogen purge. The resulting reaction mixture was stirred at 275° C. for 1 hour while under a slight nitrogen purge. 71.8 grams of a colorless distillate was collected over this heating cycle. The reaction mixture was then staged to full vacuum with stirring at 275° C. The resulting reaction mixture was stirred for 4.1 hours under full vacuum (pressure less than 100 mtorr). The vacuum was then released with nitrogen and the reaction mass allowed to cool to room temperature. An additional 55.7 grams of distillate was recovered and 445.6 grams of a solid product was recovered.

The sample was measured for laboratory relative viscosity (LRV) as described above and was found to have an LRV of 19.91. This sample was calculated to have an inherent viscosity of 0.61 dL/g.

The sample underwent differential scanning calorimetry (DSC) analysis. A glass transition temperature (Tg) was found with an onset temperature of 27.2° C., a midpoint temperature of 28.2° C., and an endpoint temperature of 28.3° C. A broad crystalline melting temperature (Tm) was observed at 187.5° C. (16.1 J/g).

This sample underwent biodegradation testing as described above. After 26.5 days of composting, 29.9 weight percent of the sample was found to have been biodegraded.

Example 25

To a 1.0 liter glass flask was added bis(2-hydroxyethyl) terephthalate (310.29 grams), dimethyl glutarate (86.24 grams), dimethyl 5-sulfoisophthalate, sodium salt (10.63 grams), tris(2-hydroxyethyl)trimellitate (1.06 grams), polyethylene glycol (average molecular weight=1450, 29.36 grams), sodium acetate (0.53 grams), manganese(II) acetate tetrahydrate (0.1637 grams), antimony(III) trioxide (0.1318 grams) and a 50 weight percent slurry of calcium carbonate in ethylene glycol (38.63 grams). The reaction mixture was stirred and heated to 180° C. under a slow nitrogen purge. After achieving 180° C., the reaction mixture was heated to 200° C. over 0.4 hours with stirring under a slow nitrogen purge. The resulting reaction mixture was stirred at 200° C. under a slight nitrogen purge for 1.0 hour. The reaction mixture was then heated to 275° C. over 0.6 hours with stirring under a slight nitrogen purge. The resulting reaction mixture was stirred at 275° C. for 1.0 hour while under a slight nitrogen purge. 60.4 grams of a colorless distillate was collected over this heating cycle. The reaction mixture was then staged to full vacuum with stirring at 275° C. The resulting reaction mixture was stirred for 2.8 hours under full vacuum (pressure less than 100 mtorr). The vacuum was then released with nitrogen and the reaction mass allowed to cool to room temperature. An additional 41.9 grams of distillate was recovered and 308.9 grams of a solid product was recovered.

The sample was measured for laboratory relative viscosity (LRV) as described above and was found to have an LRV of 43.99. This sample was calculated to have an inherent viscosity of 1.04 dL/g.

The sample underwent differential scanning calorimetry (DSC) analysis. A broad crystalline melting temperature (Tm) was observed at 184.4° C. (17.3 J/g).

This sample underwent biodegradation testing as described above. After 31 days of composting, 10.8 weight percent of the sample was found to have been biodegraded.

Example 26

To a 1.0 liter glass flask was added bis(2-hydroxyethyl) terephthalate (310.29 grams), dimethyl glutarate (86.24 grams), dimethyl 5-sulfoisophthalate, sodium salt (10.63 grams), tris(2-hydroxyethyl)trimellitate (1.06 grams), polyethylene glycol (average molecular weight=1450, 29.36 grams), sodium acetate (0.53 grams), manganese(II) acetate tetrahydrat (0.1637 grams), antimony(III) trioxide (0.1318 grams) and a 50 weight percent slurry of calcium carbonate in ethylene glycol (81.55 grams). The reaction mixture was stirred and heated to 180° C. under a slow nitrogen purge. After achieving 180° C., the reaction mixture was heated to 200° C. over 0.3 hours with stirring under a slow nitrogen purge. The resulting reaction mixture was stirred at 200° C. under a slight nitrogen purge for 0.9 hours. The reaction mixture was then heated to 275° C. over 0.9 hours with stirring under a slight nitrogen purge. The resulting reaction mixture was stirred at 275° C. for 1.3 hours while under a slight nitrogen purge. 74.3 grams of a colorless distillate was collected over this heating cycle. The reaction mixture was then staged to full vacuum with stirring at 275° C. The resulting reaction mixture was stirred for 2.2 hours under full vacuum (pressure less than 100 mtorr). The vacuum was then released with nitrogen and the reaction mass allowed to cool to room temperature. An additional 47.0 grams of distillate was recovered and 351.0 grams of a solid product was recovered.

The sample was measured for laboratory relative viscosity (LRV) as described above and was found to have an LRV of 38.48. This sample was calculated to have an inherent viscosity of 0.94 dL/g.

The sample underwent differential scanning calorimetry (DSC) analysis. During the first heating cycle, a glass transition temperature (Tg) was found with an onset temperature of 64.7° C., a midpoint temperature of 71.0° C., and an endpoint temperature of 77.4° C. This glass transition temperature was not observed within the second heating cycle of the DSC experiment. Within the second heating cycle of the DSC experiment, a broad crystalline melting temperature (Tm) was observed at 177.5° C. (16.2 J/g).

This sample underwent biodegradation testing as described above. After 31 days of composting, 9.6 weight percent of the sample was found to have been biodegraded.

Example 27

To a 1.0 liter glass flask was added bis(2-hydroxyethyl) terephthalate (310.29 grams), dimethyl glutarate (86.24 grams), dimethyl 5-sulfoisophthalate, sodium salt (10.63 grams), tris(2-hydroxyethyl)trimellitate (1.06 grams), poly-ethylene glycol (average molecular weight=1450, 29.36 grams), sodium acetate (0.53 grams), manganese(II) acetate tetrahydrate (0.1637 grams), antimony(III) trioxide (0.1318 grams) and a 50 weight percent slurry of calcium carbonate in ethylene glycol (183.48 grams). The reaction mixture was stirred and heated to 180° C. under a slow nitrogen purge. After achieving 180° C., the reaction mixture was heated to 200° C. over 0.2 hours with stirring under a slow nitrogen purge. The resulting reaction mixture was stirred at 200° C. under a slight nitrogen purge for 0.9 hours. The reaction mixture was then heated to 275° C. over 0.9 hours with stirring under a slight nitrogen purge. The resulting reaction mixture was stirred at 275° C. for 1.4 hours while under a slight nitrogen purge. 118.3 grams of a colorless distillate was collected over this heating cycle. The reaction mixture was then staged to full vacuum with stirring at 275° C. The resulting reaction mixture was stirred for 1.3 hours under full vacuum (pressure less than 100 mtorr). The vacuum was then released with nitrogen and the reaction mass allowed to cool to room temperature. An additional 50.3 grams of distillate was recovered and 404.5 grams of a solid product was recovered.

The sample was measured for laboratory relative viscosity (LRV) as described above and was found to have an LRV of 23.80. This sample was calculated to have an inherent viscosity of 0.68 dL/g.

The sample underwent differential scanning calorimetry (DSC) analysis. A broad crystalline melting temperature (Tm) was observed at 167.0° C. (11.0 J/g).

This sample underwent biodegradation testing as described above. After 31 days of composting, 14.8 weight percent of the sample was found to have been biodegraded.

Comparative Example 3

To a 1.0 liter glass flask was added bis(2-hydroxyethyl) terephthalate (443.27 grams), DBE dibasic ester (20:60:20 mole percent dimethyl succinate:dimethyl glutarate:dimethyl adipate) (123.20 grams), dimethyl 5-sulfoisophthalate, sodium salt (15.19 grams), tris(2-hydroxyethyl)trimellitate (0.20 grams), sodium acetate (0.75 grams), manganese(II) acetate tetrahydrate (0.2339 grams), and TYZOR® PC-42 organic titanate (6.3 weight percent titanium, a DuPont Company Product composed of 50 weight percent water, 38.5 weight percent of an organic titanate complex and 11.5 weight percent of an inorganic phosphorous compound) (0.1248 grams). The reaction mixture was stirred and heated to 180° C. under a slow nitrogen purge. After achieving 180° C., the reaction mixture was heated to 200° C. over 0.2 hours with stirring under a slow nitrogen purge. The resulting reaction mixture was stirred at 200° C. under a slight nitrogen purge for 1.1 hours. The reaction mixture was then heated to 275° C. over 0.8 hours with stirring under a slight nitrogen purge. The resulting reaction mixture was stirred at 275° C. for 1.1 hours while under a slight nitrogen purge. 77.3 grams of a colorless distillate was collected over this heating cycle. The reaction mixture was then staged to full vacuum with stirring at 275° C. The resulting reaction mixture was stirred for 2.5 hours under full vacuum (pressure less than 100 mtorr). The vacuum was then released with nitrogen and the reaction mass allowed to cool to room temperature. An additional 47.6 grams of distillate was recovered and 415.2 grams of a solid product was recovered.

The sample was measured for laboratory relative viscosity (LRV) as described above, and was found to have a LRV of 19.64. This sample was calculated to have an inherent viscosity (IV) of 0.60 dL/g.

The sample underwent differential scanning calorimetry (DSC) analysis. A broad crystalline melting temperature (Tm) was observed at 186.9° C. (8.9 J/g).

This sample underwent biodegradation testing as described above. After 26.3 days of composting, 13.0 weight percent of the sample was found to have been biodegraded.

Example 28

To a 1.0 liter glass flask was added bis(2-hydroxyethyl) terephthalate (443.27 grams), DBE dibasic ester (20:60:20 mole percent dimethyl succinate:dimethyl glutarate:dimethyl adipate) (123.20 grams), dimethyl 5-sulfoisophthalate, sodium salt (15.19 grams), tris(2-hydroxyethyl)trimellitate (0.20 grams), poly(ethylene glycol) (average molecular weight of 1500) (41.94 grams), sodium acetate (0.75 grams), manganese(II) acetate tetrahydrate (0.2339 grams), and TYZOR® PC-42 organic titanate (6.3 weight percent titanium, a DuPont Company Product composed of 50 weight percent water, 38.5 weight percent of an organic titanate complex and 11.5 weight percent of an inorganic phosphorous compound) (0.1248 grams). The reaction mixture was stirred and heated to 180° C. under a slow nitrogen purge. After achieving 180° C., the reaction mixture was heated to 200° C. over 0.3 hours with stirring under a slow nitrogen purge. The resulting reaction mixture was stirred at 200° C. under a slight nitrogen purge for 1.0 hour. The reaction mixture was then heated to 275° C. over 0.8 hours with stirring under a slight nitrogen purge. The resulting reaction mixture was stirred at 275° C. for 1.0 hour while under a slight nitrogen purge. 70.8 grams of a colorless distillate was collected over this heating cycle. The reaction mixture was then staged to full vacuum with stirring at 275° C. The resulting reaction mixture was stirred for 2.9 hours under full vacuum (pressure less than 100 mtorr). The vacuum was then released with nitrogen and the reaction mass allowed to cool to room temperature. An additional 49.3 grams of distillate was recovered and 470.5 grams of a solid product was recovered.

The sample was measured for laboratory relative viscosity (LRV) as described above, and was found to have a LRV of 21.79. This sample was calculated to have an inherent viscosity (IV) of 0.64 dL/g.

The sample underwent differential scanning calorimetry (DSC) analysis. A broad crystalline melting temperature (Tm) was observed at 182.5° C. (17.9 J/g).

This sample underwent biodegradation testing as described above. After 26.3 days of composting, 31.6 weight percent of the sample was found to have been biodegraded.

Example 29

To a 1.0 liter glass flask was added bis(2-hydroxyethyl) terephthalate (443.27 grams), DBE dibasic ester (20:60:20 mole percent dimethyl succinate:dimethyl glutarate:dimethyl adipate) (123.20 grams), dimethyl 5-sulfoisophthalate, sodium salt (15.19 grams), tris(2-hydroxyethyl)trimellitate (0.20 grams), poly(ethylene glycol) (average molecular weight of 3400) (41.94 grams), sodium acetate (0.75 grams), manganese(II) acetate tetrahydrate (0.2339 grams), and TYZOR® PC-42 organic titanate (6.3 weight percent titanium, a DuPont Company Product composed of 50 weight percent water, 38.5 weight percent of an organic titanate complex and 11.5 weight percent of an inorganic phosphorous compound) (0.1248 grams). The reaction mixture was stirred and heated to 180° C. under a slow nitrogen purge. After achieving 180° C., the reaction mixture was heated to 200° C. over 0.2 hours with stirring under a slow nitrogen purge. The resulting reaction mixture was stirred at 200° C. under a slight nitrogen purge for 1.0 hour. The reaction mixture was then heated to 275° C. over 0.9 hours with stirring under a slight nitrogen purge. The resulting reaction mixture was stirred at 275° C. for 1.0 hour while under a slight nitrogen purge. 67.3 grams of a colorless distillate was collected over this heating cycle. The reaction mixture was then staged to full vacuum with stirring at 275° C. The resulting reaction mixture was stirred for 3.2 hours under full vacuum (pressure less than 100 mtorr). The vacuum was then released with nitrogen and the reaction mass allowed to cool to room temperature. An additional 50.9 grams of distillate was recovered and 466.1 grams of a solid product was recovered.

The sample was measured for laboratory relative viscosity (LRV) as described above, and was found to have a LRV of 27.16. This sample was calculated to have an inherent viscosity (IV) of 0.74 dL/g.

The sample underwent differential scanning calorimetry (DSC) analysis. A broad crystalline melting temperature (Tm) was observed at 178.0° C. (14.9 J/g).

This sample underwent biodegradation testing as described above. After 26.3 days of composting, 36.7 weight percent of the sample was found to have been biodegraded.

Example 30

To a 1.0 liter glass flask was added bis(2-hydroxyethyl) terephthalate (443.27 grams), dimethyl adipate (134.0 grams), dimethyl 5-sulfoisophthalate, sodium salt (15.19 grams), tris(2-hydroxyethyl)trimellitate (0.20 grams), poly(ethylene glycol) (average molecular weight of 1500) (41.94 grams), sodium acetate (0.75 grams), manganese(II) acetate tetrahydrate (0.2339 grams), and TYZOR® PC-42 organic titanate (6.3 weight percent titanium, a DuPont Company Product composed of 50 weight percent water, 38.5 weight percent of an organic titanate complex and 11.5 weight percent of an inorganic phosphorous compound) (0.1248 grams). The reaction mixture was stirred and heated to 180° C. under a slow nitrogen purge. After achieving 180° C., the reaction mixture was heated to 200° C. over 0.3 hours with stirring under a slow nitrogen purge. The resulting reaction mixture was stirred at 200° C. under a slight nitrogen purge for 0.6 hours. The reaction mixture was then heated to 275° C. over 0.8 hours with stirring under a slight nitrogen purge. The resulting reaction mixture was stirred at 275° C. for 1.0 hour while under a slight nitrogen purge. 96.2 grams of a colorless distillate was collected over this heating cycle. The reaction mixture was then staged to full vacuum with stirring at 275° C. The resulting reaction mixture was stirred for 3.3 hours under full vacuum (pressure less than 100 mtorr). The vacuum was then released with nitrogen and the reaction mass allowed to cool to room temperature. An additional 37.5 grams of distillate was recovered and 448.9 grams of a solid product was recovered.

The sample was measured for laboratory relative viscosity (LRV) as described above, and was found to have a LRV of 14.85. This sample was calculated to have an inherent viscosity (IV) of 0.51 dL/g.

The sample underwent differential scanning calorimetry (DSC) analysis. A broad crystalline melting temperature (Tm) was observed at 193.2° C. (23.1 J/g).

This sample underwent biodegradation testing as described above. After 26.3 days of composting, 28.0 weight percent of the sample was found to have been biodegraded.

Example 31

To a 250 milliliter glass flask was added bis(2-hydroxyethyl)terephthalate (114.03 grams), DBA dibasic acid (20:60:20 mole percent mixture of succinic acid:glutaric acid:adipic acid) (25.43 grams), dimethyl 5-sulfoisophthalate, sodium salt (0.19 grams), poly(ethylene glycol) (average molecular weight of 1500) (10.60 grams), manganese(II) acetate tetrahydrate (0.0591 grams), antimony(III) oxide (0.0476 grams), and a 50 weight percent slurry of calcium carbonate in ethylene glycol (29.42 grams). The reaction mixture was stirred and heated to 180° C. under a slow nitrogen purge. After achieving 180° C., the reaction mixture was heated to 200° C. over 0.5 hours with stirring under a slow nitrogen purge. The resulting reaction mixture was stirred at 200° C. under a slight nitrogen purge for 1.3 hours. The reaction mixture was then heated to 275° C. over 1.7 hours with stirring under a slight nitrogen purge. The resulting reaction mixture was stirred at 275° C. for 0.9 hours while under a slight nitrogen purge. 21.8 grams of a colorless distillate was collected over this heating cycle. The reaction mixture was then staged to full vacuum with stirring at 275° C. The resulting reaction mixture was stirred for 2.8 hours under full vacuum (pressure less than 100 mtorr). The vacuum was then released with nitrogen and the reaction mass allowed to cool to room temperature. An additional 13.8 grams of distillate was recovered and 125.4 grams of a solid product was recovered.

The sample was measured for laboratory relative viscosity (LRV) as described above, and was found to have a LRV of 17.92. This sample was calculated to have an inherent viscosity (IV) of 0.57 dL/g.

The sample underwent differential scanning calorimetry (DSC) analysis. A broad crystalline melting temperature (Tm) was observed at 178.9° C. (14.8 J/g).

Example 32

To a 1.0 liter glass flask was added bis(2-hydroxyethyl) terephthalate (287.48 grams), dimethyl glutarate (100.62 grams), dimethyl 5-sulfoisophthalate, sodium salt (10.63 grams), tris(2-hydroxyethyl)trimellitate (1.06 grams), polyethylene glycol (average molecular weight=1450, 28.44 grams), sodium acetate (0.53 grams), manganese(II) acetate tetrahydrate (0.1637 grams), antimony(III) trioxide (0.1318 grams) and a 50 weight percent slurry of calcium carbonate in ethylene glycol (177.73 grams). The reaction mixture was stirred and heated to 180° C. under a slow nitrogen purge. After achieving 180° C., the reaction mixture was heated to 200° C. over 0.3 hours with stirring under a slow nitrogen purge. The resulting reaction mixture was stirred at 200° C. under a slight nitrogen purge for 1 hour. The reaction mixture was then heated to 275° C. over 1.2 hours with stirring under a slight nitrogen purge. The resulting reaction mixture was stirred at 275° C. for 1.4 hours while under a slight nitrogen purge. 101.9 grams of a colorless distillate was collected over this heating cycle. The reaction mixture was then staged to full vacuum with stirring at 275° C. The resulting reaction mixture was stirred for 1.5 hours under full vacuum (pressure less than 100 mtorr). The vacuum was then released with nitrogen and the reaction mass allowed to cool to room temperature. An additional 54.7 grams of distillate was recovered and 412.0 grams of a solid product was recovered.

The sample was measured for laboratory relative viscosity (LRV) as described above and was found to have an LRV of 31.44. This sample was calculated to have an inherent viscosity of 0.82 dL/g.

The sample underwent differential scanning calorimetry (DSC) analysis. A broad crystalline melting temperature (Tm) was observed at 155.5° C. (13.4 J/g).

This sample underwent biodegradation testing as described above. After 31 days of composting, 14.6 weight percent of the sample was found to have been biodegraded.

Example 33

To a 1.0 liter glass flask was added bis(2-hydroxyethyl)terephthalate (378.09 grams), dimethyl glutarate (164.27 grams), dimethyl 5-sulfoisophthalate, sodium salt (15.19 grams), tris(2-hydroxyethyl)trimellitate (0.67 grams), ethylene glycol (70.03 grams), polyethylene glycol (average molecular weight=1450, 41.94 grams), sodium acetate (0.75 grams), manganese(II) acetate tetrahydrate (0.2339 grams), and antimony(III) trioxide (0.1883 grams). The reaction mixture was stirred and heated to 180° C. under a slow nitrogen purge. After achieving 180° C., the reaction mixture was heated to 200° C. over 0.3 hours with stirring under a slow nitrogen purge. The resulting reaction mixture was stirred at 200° C. under a slight nitrogen purge for 0.9 hours. The reaction mixture was then heated to 275° C. over 1.8 hours with stirring under a slight nitrogen purge. The resulting reaction mixture was stirred at 275° C. for 1.0 hour while under a slight nitrogen purge. 104.5 grams of a colorless distillate was collected over this heating cycle. The reaction mixture was then staged to full vacuum with stirring at 275° C. The resulting reaction mixture was stirred for 5.6 hours under full vacuum (pressure less than 100 mtorr). The vacuum was then released with nitrogen and the reaction mass allowed to cool to room temperature. An additional 74.8 grams of distillate was recovered and 454.0 grams of a solid product was recovered.

The sample was measured for laboratory relative viscosity (LRV) as described above and was found to have an LRV of 21.82. This sample was calculated to have an inherent viscosity of 0.64 dL/g.

The sample underwent differential scanning calorimetry (DSC) analysis. A broad crystalline melting temperature (Tm) was observed at 157.6° C. (0.3 J/g).

Example 34

To a 1.0 liter glass flask was added bis(2-hydroxyethyl)terephthalate (264.66 grams), dimethyl glutarate (114.99 grams), dimethyl 5-sulfoisophthalate, sodium salt (10.63 grams), tris(2-hydroxyethyl)trimellitate (1.06 grams), polyethylene glycol (average molecular weight=1450, 28.17 grams), sodium acetate (0.53 grams), manganese(II) acetate tetrahydrate (0.1637 grams), antimony(III) trioxide (0.1318 grams) and a 50 weight percent slurry of calcium carbonate in ethylene glycol (176.08 grams). The reaction mixture was stirred and heated to 180° C. under a slow nitrogen purge. After achieving 180° C., the reaction mixture was heated to 200° C. over 0.4 hours with stirring under a slow nitrogen purge. The resulting reaction mixture was stirred at 200° C. under a slight nitrogen purge for 0.9 hours. The reaction mixture was then heated to 275° C. over 0.8 hours with stirring under a slight nitrogen purge. The resulting reaction mixture was stirred at 275° C. for 1.1 hours while under a slight nitrogen purge. 105.6 grams of a colorless distillate was collected over this heating cycle. The reaction mixture was then staged to full vacuum with stirring at 275° C. The resulting reaction mixture was stirred for 1.5 hours under full vacuum (pressure less than 100 mtorr). The vacuum was then released with nitrogen and the reaction mass allowed to cool to room temperature. An additional 51.5 grams of distillate was recovered and 384.7 grams of a solid product was recovered.

The sample was measured for laboratory relative viscosity (LRV) as described above and was found to have an LRV of 27.73. This sample was calculated to have an inherent viscosity of 0.75 dL/g.

The sample underwent differential scanning calorimetry (DSC) analysis. Within the first heating cycle, a glass transition temperature (Tg) was found with an onset temperature of 42.8° C., a midpoint temperature of 45.7° C., and an endpoint temperature of 48.5° C. This Tg was not observed during the second heating cycle of the DSC experiment. Within the second heating cycle, a broad crystalline melting temperature (Tm) was observed at 151.8° C. (1.8 J/g).

This sample underwent biodegradation testing as described above. After 31 days of composting, 19.5 weight percent of the sample was found to have been biodegraded.

Example 35

To a 1.0 liter glass flask was added bis(2-hydroxyethyl)terephthalate (219.03 grams), dimethyl glutarate (143.74 grams), dimethyl 5-sulfoisophthalate, sodium salt (10.63 grams), tris(2-hydroxyethyl)trimellitate (1.06 grams), polyethylene glycol (average molecular weight=1450, 27.64 grams), sodium acetate (0.53 grams), manganese(II) acetate tetrahydrate (0.1637 grams), antimony(III) trioxide (0.1318 grams) and a 50 weight percent slurry of calcium carbonate in ethylene glycol (172.78 grams). The reaction mixture was stirred and heated to 180° C. under a slow nitrogen purge. After achieving 180° C., the reaction mixture was heated to 200° C. over 0.6 hours with stirring under a slow nitrogen purge. The resulting reaction mixture was stirred at 200° C. under a slight nitrogen purge for 1.0 hour. The reaction mixture was then heated to 275° C. over 0.8 hours with stirring under a slight nitrogen purge. The resulting reaction mixture was stirred at 275° C. for 1.4 hours while under a slight nitrogen purge. 90.1 grams of a colorless distillate was collected over this heating cycle. The reaction mixture was then staged to full vacuum with stirring at 275° C. The resulting reaction mixture was stirred for 1.9 hours under full vacuum (pressure less than 100 mtorr). The vacuum was then released with nitrogen and the reaction mass allowed to cool to room temperature. An additional 48.9 grams of distillate was recovered and 384.7 grams of a solid product was recovered.

The sample was measured for laboratory relative viscosity (LRV) as described above and was found to have an LRV of 37.71. This sample was calculated to have an inherent viscosity of 0.93 dL/g.

The sample underwent differential scanning calorimetry (DSC) analysis. Within the first heating cycle, a glass transition temperature (Tg) was found with an onset temperature of 46.6° C., a midpoint temperature of 48.7° C., and an endpoint temperature of 50.9° C. This Tg was not observed during the second heating cycle of the DSC experiment. Within the second heating cycle, a small crystalline melting temperature (Tm) was observed at 138.5° C. (0.1 J/g).

This sample underwent biodegradation testing as described above. After 31 days of composting, 28.3 weight percent of the sample was found to have been biodegraded.

Example 36

To a 250 milliliter glass flask was added dimethyl terephthalate (66.02 grams), DBE dibasic ester (20:60:20 mole percent dimethyl succinate:dimethyl glutarate:dimethyl adipate) (24.03 grams), dimethyl 5-sulfoisophthalate, sodium salt (2.96 grams), 1,3-propanediol (60.88 grams), poly(tetramethylene glycol) (average molecular weight of 2000) (5.00 grams), and titanium(IV) isopropoxide (0.058 grams). The reaction mixture was stirred and heated to 180° C. under a slow nitrogen purge. After achieving 180° C., the reaction mixture was heated to 190° C. over 0.5 hours with stirring under a slight nitrogen purge. The resulting reaction mixture was stirred at 190° C. for 1.0 hour with a slight nitrogen purge. The reaction mixture was then heated to 200° C. over 0.4 hours with stirring under a slow nitrogen purge. The resulting reaction mixture was stirred at 200° C. under a slight nitrogen purge for 1.0 hour. The reaction mixture was then heated to 255° C. over 1.9 hours with stirring under a slight nitrogen purge. The resulting reaction mixture was stirred at 255° C. for 0.4 hours while under a slight nitrogen purge. 28.5 grams of a colorless distillate was collected over this heating cycle. The reaction mixture was then staged to full vacuum with stirring at 255° C. The resulting reaction mixture was stirred for 2.8 hours under full vacuum (pressure less than 100 mtorr). The vacuum was then released with nitrogen and the reaction mass allowed to cool to room temperature. An additional 17.7 grams of distillate was recovered and 95.9 grams of a solid product was recovered.

The sample was measured for laboratory relative viscosity (LRV) as described above, and was found to have a LRV of 30.23. This sample was calculated to have an inherent viscosity (IV) of 0.79 dL/g.

The sample underwent differential scanning calorimetry (DSC) analysis. A crystalline melting temperature (Tm) was observed at 167.6° C. (29.9 J/g).

Example 37

To a 250 milliliter glass flask was added dimethyl terephthalate (47.58 grams), DBE dibasic ester (20:60:20 mole percent dimethyl succinate:dimethyl glutarate:dimethyl adipate) (40.04 grams), dimethyl 5-sulfoisophthalate, sodium salt (1.48 grams), 1,3-propanediol (60.88 grams), poly(tetramethylene glycol) (average molecular weight of 2000) (20.08 grams), kaolin (12.04 grams), and titanium(IV) isopropoxide (0.062 grams). The reaction mixture was stirred and heated to 180° C. under a slow nitrogen purge. After achieving 180° C., the reaction mixture was heated to 190° C. over 0.4 hours with stirring under a slight nitrogen purge. The resulting reaction mixture was stirred at 190° C. for 1.0 hour with a slight nitrogen purge. The reaction mixture was then heated to 200° C. over 0.4 hours with stirring under a slow nitrogen purge. The resulting reaction mixture was stirred at 200° C. under a slight nitrogen purge for 0.9 hours. The reaction mixture was then heated to 255° C. over 2.0 hours with stirring under a slight nitrogen purge. The resulting reaction mixture was stirred at 255° C. for 0.6 hours while under a slight nitrogen purge. 34.1 grams of a colorless distillate was collected over this heating cycle. The reaction mixture was then staged to full vacuum with stirring at 255° C. The resulting reaction mixture was stirred for 1.5 hours under full vacuum (pressure less than 100 mtorr). The vacuum was then released with nitrogen and the reaction mass allowed to cool to room temperature. An additional 1.4 grams of distillate was recovered and 85.5 grams of a solid product was recovered.

The sample was measured for laboratory relative viscosity (LRV) as described above, and was found to have a LRV of 3.99. This sample was calculated to have an inherent viscosity (IV) of 0.32 dL/g.

Example 38

To a 250 milliliter glass flask was added dimethyl terephthalate (66.70 grams), dimethyl adipate (25.61 grams), dimethyl 5-sulfoisophthalate, sodium salt (2.52 grams), 1,2,4,5-benzenetetracarboxylic dianhydride (pyromellitic dianhydride, PMDA) (0.22 grams), 1,4-butanediol (72.10 grams), poly(ethylene glycol) (average molecular weight of 1500) (15.00 grams), and titanium(IV) isopropoxide (0.062 grams). The reaction mixture was stirred and heated to 180° C. under a slow nitrogen purge. After achieving 180° C., the reaction mixture was heated to 190° C. over 0.4 hours with stirring under a slight nitrogen purge. The resulting reaction mixture was stirred at 190° C. for 1.0 hour with a slight nitrogen purge. The reaction mixture was then heated to 200° C. over 0.6 hours with stirring under a slow nitrogen purge. The resulting reaction mixture was stirred at 200° C. under a slight nitrogen purge for 1.0 hours. The reaction mixture was then heated to 255° C. over 1.6 hours with stirring under a slight nitrogen purge. The resulting reaction mixture was stirred at 255° C. for 0.9 hours while under a slight nitrogen purge. 44.0 grams of a colorless distillate was collected over this heating cycle. The reaction mixture was then staged to full vacuum with stirring at 255° C. The resulting reaction mixture was stirred for 2.0 hours under full vacuum (pressure less than 100 mtorr). The vacuum was then released with nitrogen and the reaction mass allowed to cool to room temperature. An additional 2.8 grams of distillate was recovered and 113.4 grams of a solid product was recovered.

The sample was measured for laboratory relative viscosity (LRV) as described above, and was found to have a LRV of 45.69. This sample was calculated to have an inherent viscosity (IV) of 1.07 dL/g.

The sample underwent differential scanning calorimetry (DSC) analysis. A crystalline melting temperature (Tm) was observed at 167.8° C. (20.9 J/g).

Example 39

To a 250 milliliter glass flask was added dimethyl terephthalate (66.02 grams), DBE dibasic ester (20:60:20 mole percent dimethyl succinate:dimethyl glutarate:dimethyl adipate) (24.03 grams), dimethyl 5-sulfoisophthalate, sodium salt (3.40 grams), 1,4-butanediol (72.10 grams), poly(tetramethylene glycol) (average molecular weight of 2000) (2.08 grams), and titanium(IV) isopropoxide (0.062 grams). The reaction mixture was stirred and heated to 180° C. under a slow nitrogen purge. After achieving 180° C., the reaction mixture was heated to 190° C. over 0.3 hours with stirring under a slight nitrogen purge. The resulting reaction mixture was stirred at 190° C. for 1.0 hour with a slight nitrogen purge. The reaction mixture was then heated to 200° C. over 0.4 hours with stirring under a slow nitrogen purge. The resulting reaction mixture was stirred at 200° C. under a slight nitrogen purge for 1.1 hours. The reaction mixture was then heated to 255° C. over 1.8 hours with stirring under a slight nitrogen purge. The resulting reaction mixture was stirred at 255° C. for 0.5 hours while under a slight nitrogen purge. 49.9 grams of a colorless distillate was collected over this heating cycle. The reaction mixture was then staged to full vacuum with stirring at 255° C. The resulting reaction mixture was stirred for 3.1 hours under full vacuum (pressure less than 100 mtorr). The vacuum was then released with nitrogen and the reaction mass allowed to cool to room temperature. An additional 0.4 grams of distillate was recovered and 99.9 grams of a solid product was recovered.

The sample was measured for laboratory relative viscosity (LRV) as described above, and was found to have a LRV of 9.50. This sample was calculated to have an inherent viscosity (IV) of 0.42 dL/g.

The sample underwent differential scanning calorimetry (DSC) analysis. A crystalline melting temperature (Tm) was observed at 171.9° C. (27.6 J/g).

Example 40

To a 250 milliliter glass flask was added dimethyl terephthalate (47.58 grams), DBE dibasic ester (20:60:20 mole percent dimethyl succinate:dimethyl glutarate:dimethyl adipate) (40.04 grams), dimethyl 5-sulfoisophthalate, sodium salt (1.48 grams), 1,4-butanediol (72.10 grams), poly(tetramethylene glycol) (average molecular weight of 2000) (20.08 grams), silica (12.04 grams), and titanium(IV) isopropoxide (0.062 grams). The reaction mixture was stirred and heated to 180° C. under a slow nitrogen purge. After achieving 180° C., the reaction mixture was heated to 190° C. over 0.3 hours with stirring under a slight nitrogen purge. The resulting reaction mixture was stirred at 190° C. for 1.0 hour with a slight nitrogen purge. The reaction mixture was then heated to 200° C. over 0.1 hours with stirring under a slow nitrogen purge. The resulting reaction mixture was stirred at 200° C. under a slight nitrogen purge for 1.1 hours. The reaction mixture was then heated to 255° C. over 0.6 hours with stirring under a slight nitrogen purge. The resulting reaction mixture was stirred at 255° C. for 0.5 hours while under a slight nitrogen purge. 37.9 grams of a colorless distillate was collected over this heating cycle. The reaction mixture was then staged to full vacuum with stirring at 255° C. The resulting reaction mixture was stirred for 3.6 hours under full vacuum (pressure less than 100 mtorr). The vacuum was then released with nitrogen and the reaction mass allowed to cool to room temperature. An additional 13.6 grams of distillate was recovered and 120.1 grams of a solid product was recovered.

The sample was measured for laboratory relative viscosity (LRV) as described above, and was found to have a LRV of 13.98. This sample was calculated to have an inherent viscosity (IV) of 0.50 dL/g.

The sample underwent differential scanning calorimetry (DSC) analysis. A crystalline melting temperature (Tm) was observed at 115.9° C. (12.1 J/g).

Although illustrated and described above with reference to specific embodiments, the present invention is nevertheless not intended to be limited to the details shown. Rather, various modifications may be made in the details within the scope and range of equivalents of the claims and without departing from the spirit of the invention.

What is claimed is:

1. A sulfonated aliphatic-aromatic copolyetherester consisting essentially of:
    80.0 to 20.0 mole percent of an aromatic dicarboxylic acid residue based on the total moles of dicarboxylic acid residue;
    20.0 to 80.0 mole percent of an aliphatic dicarboxylic acid residue based on the total moles of dicarboxylic acid residue;
    0.1 to 10.0 mole percent of a sulfonate component residue;
    99.9 to 91.0 mole percent of a first glycol residue selected from the group consisting of ethylene glycol residue, 1,3-propanediol residue, and 1,4-butanediol residue based on the total moles of glycol residue;
    0.1 to 4.0 mole percent of a poly(alkylene ether) glycol residue based on the total moles of glycol residue;
    0 to 5.0 mole percent of a second glycol residue based on the total moles of glycol residue; and
    0 to 5.0 mole percent of a polyfunctional branching agent residue;
    said sulfonated aliphatic-aromatic copolyetherester having a crystalline melting temperature of at least 203.5° C. and not more than 217.5° C.

2. The copolyetherester of claim 1 that is biodegradable.

3. A sulfonated aliphatic-aromatic copolyetherester filled composition that comprises the copolyetherester of claim 1 and a filler, said filler being 0.01 to 80 weight percent of said filled composition.

4. The filled composition of claim 3 wherein said filler comprises an inorganic filler.

5. The filled composition of claim 3 wherein said filler comprises a clay filler.

6. The filled composition of claim 3 that is biodegradable.

7. A shaped article formed from the copolyetherester of claim 1.

8. The article of claim 7 that is a film, sheet, fiber, melt blown container, molded part, foamed part, polymeric melt extrusion coating, or polymeric solution coating.

9. The article of claim 7 that is biodegradable.

10. A shaped article formed from the filled composition of claim 3.

11. The article of claim 10 wherein said filler comprises an inorganic filler.

12. The article of claim 11 that is a film, sheet, fiber, melt blown container, molded part, foamed part, polymeric melt extrusion coating, or polymeric solution coating.

13. The article of claim 11 that is biodegradable.

14. The article of claim 10 wherein said filler comprises a clay filler.

15. The article of claim 14 that is a film, sheet, fiber, melt blown container, molded part, foamed part, polymeric melt extrusion coating, or polymeric solution coating.

16. The article of claim 14 that is biodegradable.

* * * * *

UNITED STATES PATENT AND TRADEMARK OFFICE
CERTIFICATE OF CORRECTION

PATENT NO.        : 7,625,994 B2                                              Page 1 of 1
APPLICATION NO.   : 10/209369
DATED             : December 1, 2009
INVENTOR(S)       : Richard Allen Hayes It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 200 days.

Signed and Sealed this

Second Day of November, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,625,994 B2 | |
| APPLICATION NO. | : 10/209369 | |
| DATED | : December 1, 2009 | |
| INVENTOR(S) | : Richard Allen Hayes | |

It is certified that error appears in the above-identified patent and that said Letters Patent is hereby corrected as shown below:

This certificate supersedes the Certificate of Correction issued November 2, 2010. The Certificate of Correction included change to patent term adjustment "by 200 days" which was corrected by decision dated September 9, 2010 changing the patent term adjustment to be extended or adjusted "by 670 days". The [*] Notice should read as follows:

On the Title Page:

The first or sole Notice should read --

Subject to any disclaimer, the term of this patent is extended or adjusted under 35 U.S.C. 154(b) by 670 days.

Signed and Sealed this
Twenty-second Day of February, 2011

David J. Kappos
*Director of the United States Patent and Trademark Office*